(12) United States Patent  
Wang et al.

(10) Patent No.: US 9,426,717 B2  
(45) Date of Patent: *Aug. 23, 2016

(54) MAC HEADER BASED TRAFFIC CLASSIFICATION AND METHODS FOR USE THEREWITH

(71) Applicant: BROADCOM CORPORATION, Irvine, CA (US)

(72) Inventors: Qi Wang, San Francisco, CA (US); Matthew James Fischer, Mountain View, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,838

(22) Filed: Jul. 31, 2015

(65) Prior Publication Data

US 2015/0341841 A1    Nov. 26, 2015

Related U.S. Application Data

(63) Continuation of application No. 13/855,095, filed on Apr. 2, 2013, now Pat. No. 9,119,129.

(60) Provisional application No. 61/643,244, filed on May 5, 2012, provisional application No. 61/669,114, filed on Jul. 8, 2012, provisional application No. 61/770,663, filed on Feb. 28, 2013, provisional application No. 61/770,710, filed on Feb. 28, 2013.

(51) Int. Cl.  
*H04W 40/02* (2009.01)  
*H04L 29/06* (2006.01)  
*H04L 12/851* (2013.01)

(52) U.S. Cl.  
CPC .......... *H04W 40/02* (2013.01); *H04L 47/2441* (2013.01); *H04L 63/0227* (2013.01); *H04L 63/162* (2013.01)

(58) Field of Classification Search  
None  
See application file for complete search history.

(56) References Cited

U.S. PATENT DOCUMENTS

2003/0081547 A1* 5/2003 Ho .................. H04L 12/5695  
 370/229  
2008/0084866 A1* 4/2008 Johnson .................. H04L 45/00  
 370/351

* cited by examiner

*Primary Examiner* — Ian N. Moore  
*Assistant Examiner* — Lakeram Jangbahadur  
(74) *Attorney, Agent, or Firm* — Garlick & Markison; Bruce E. Stuckman

(57) ABSTRACT

A transceiver of an apparatus supports communication with at least one additional apparatus. A processing module processes at least a portion of media access control (MAC) header content of a MAC frame within a signal received via the at least one transceiver or generated internally. In particular, the MAC header content, and optionally the MAC payload content, is processed based on a filter and classification agreement between the apparatus and the at least one additional apparatus to classify the MAC frame.

20 Claims, 41 Drawing Sheets

600

| Type value b3 b2 | Type description | Subtype value B7 b6 b5 b4 | Subtype description |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110 | Timing Advertisement |
| 00 | Management | 0111 | Reserved |
| 00 | Management | 1000 | Beacon |
| 00 | Management | 1001 | ATIM |
| 00 | Management | 1010 | Disassociation |
| 00 | Management | 1011 | Authentication |
| 00 | Management | 1100 | Deauthentication |
| 00 | Management | 1101 | Action |
| 00 | Management | 1110 | Action No Ack |
| 00 | Management | 1111 | Reserved |
| 01 | Control | 0000-0110 | Reserved |
| 01 | Control | 0111 | Control Wrapper |
| 01 | Control | 1000 | Block Ack Request (BlockAckReq) |

- WLAN frame MAC header – frame types – valid type and subtype combinations (1)

| Type value b3 b2 | Type description | Subtype value B7 b6 b5 b4 | Subtype description |
|---|---|---|---|
| 01 | Control | 1001 | Block Ack (BlockAck) |
| 01 | Control | 1010 | PS-Poll |
| 01 | Control | 1011 | RTS |
| 01 | Control | 1100 | CTS |
| 01 | Control | 1101 | 01 |
| 01 | Control | 1110 | CF-End |
| 01 | Control | 1111 | CF-End + CF-Ack |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null (no data) |
| 10 | Data | 0101 | CF-Ack (no data) |
| 10 | Data | 0110 | CF-Poll (no data) |
| 10 | Data | 0111 | CF-Ack + CF-Poll (no data) |
| 10 | Data | 1000 | QoS Data |

- WLAN frame MAC header – frame types – valid type and subtype combinations (2)

FIG. 7

| Type value b3 b2 | Type description | Subtype value B7 b6 b5 b4 | Subtype description |
|---|---|---|---|
| 10 | Data | 1001 | QoS Data + CF-Ack |
| 10 | Data | 1010 | QoS Data + CF-Poll |
| 10 | Data | 1011 | QoS Data + CF-Ack + CF-Poll |
| 10 | Data | 1100 | QoS Null (no data) |
| 10 | Data | 1101 | Reserved |
| 10 | Data | 1110 | QoS CF-Poll (no data) |
| 10 | Data | 1111 | Reserved |
| 10 | Data | | QoS CF Ack + CF-Poll (no data) |
| 11 | Reserved | 0000 – 1111 | Reserved |

800

- WLAN frame MAC header – frame types – valid type and subtype combinations (3)

| Type value b3 b2 | Type description | Subtype value B7 b6 b5 b4 | Subtype description |
|---|---|---|---|
| 01 | Control | 0001-0101 | Reserved |
| 01 | Control | 0110 | Control frame extension |
| 11 | Extension | 0000 | DMG Beacon |
| 11 | Extension | 0001 - 0111 | Reserved |

- WLAN frame MAC header – frame types – valid type and subtype combinations (4)

FIG. 9

| Type value b3 b2 | Subtype value b7b6b5b4 | Control Frame Extension value b11b10b9b8 | Description |
|---|---|---|---|
| 01 | 0110 | 0000 | Reserved |
| 01 | 0110 | 0001 | Reserved |
| 01 | 0110 | 0010 | Poll |
| 01 | 0110 | 0011 | SPR |
| 01 | 0110 | 0100 | Grant |
| 01 | 0110 | 0101 | DMG CTS |

1000

- Control Frame Extension (1)

FIG. 10

| Type value b3 b2 | Subtype value b7b6b5b4 | Control Frame Extension value b11b10b9b8 | Description |
|---|---|---|---|
| 01 | 0110 | 0110 | DMG DTS |
| 01 | 0110 | 0111 | Reserved |
| 01 | 0110 | 1000 | SSW |
| 01 | 0110 | 1001 | SSW - Feedback |
| 01 | 0110 | 1010 | SSW - ACK |
| 01 | 0110 | 1011-1111 | Reserved |

1100

- Control Frame Extension (2)

FIG. 11

| To DS and From DS values | Meaning |
|---|---|
| To DS = 0, From DS = 0 | A data frame direct from one STA to another STA within the same IBSS, a data frame direct from one non-AP STA to another non-AP STA within the same BSS, or a data frame outside the context of a BSS as well as all management and control frames. |
| To DS = 1, From DS = 0 | A data frame destined for the DS or being sent by a STA associated with an AP to the Port Access Entity in that AP. |
| To DS = 0, From DS = 1 | A data frame exiting the DS or being sent by the Port Access Entity in an AP, or a group addressed Mesh Data frame with Mesh Control field present using the three-address MAC header format. |
| To DS = 1, From DS = 1 | A data frame using the four-address MAC header format. This standard defines procedures for using this combination of field values only in a mesh BSS |

1200

- To/From DS combinations in frames (1)

FIG. 12

| To DS and From DS values | Meaning |
|---|---|
| To DS = 0, From DS = 0 | A data frame direct from one STA to another STA within the same IBSS or the same PBSS, or a data frame direct from one non-AP STA to another non-AP STA within the same infrastructure BSS, as well as all management, extension and control frames. |
| To DS = 0, From DS = 0 | A data frame destined for the DS or being sent by a STA associated with an AP to the Port Access Entity in that AP. |
| To DS = 0, From DS = 1 | A data frame exiting the DS or being sent by the Port Access Entity in an AP. |
| To DS = 1, From DS = 1 | A data frame using the four-address MAC header format. This standard does not define procedures for using this combination of field values. |

1300

- To/From DS combinations in frames (2)

| Identifier | Subelement name | Length (in octets) |
|---|---|---|
| 1 | TFS subelement | 5 to 254 |
| 221 | Vendor Specific subelement | 5 to 254 |
| 0, 2 to 220, 222 to 255 | Reserved | |

- TFS Request subelements

| Element ID | Length | Processing |
|---|---|---|
| 1 | 1 | 1 | octets:

- TCLAS Processing element

FIG. 18

| Processing subfield value | Meaning |
|---|---|
| 0 | Incoming MSDU's higher layer parameters have to match to the parameters in all the associated TCLAS elements. |
| 1 | Incoming MSDU's higher layer parameters have to match to at least one of the associated TCLAS elements. |
| 2 | Incoming MSDUs that do not belong to any other TS are classified to the TS for which this TCLAS processing elements is used. In this case, there are not any associated TCLAS elements. |
| 3-255 | Reserved |

1900 may be used to add 1 or more additional processing value(s) and the associated meaning for classification

- Encoding of Processing subfield

| Classifier Type | Classifier Parameters |
|---|---|
| 0 | Ethernet parameters |
| 1 | TCP/UDP IP parameters |
| 2 | IEEE 802.1Q parameters |
| 3 | Filter Offset parameters |
| 4 | IP and higher layer parameters |
| 5 | IEEE 802.1D/Q parameters |
| 6-255 | Reserved | may be used to add 1 or more add'l parameters for classification

- Frame classifier type

2300 bits:

| B0 B1 | B2 B3 | B4 B7 | B8 | B9 | B10 | B11 | B12 | B13 | B14 | B15 |
|---|---|---|---|---|---|---|---|---|---|---|
| Protocol version Match Spec. | Type Match Spec. | Subtype Match Spec. | To DS match spec | From DS match spec | More fragment Match Spec. | Retry Match Spec. | Power MGMT Match Spec. | More data Match Spec. | Pro-tected frame Match Spec. | Order Match Spec. |

- Frame Control Match Specification subfield format (e.g., design option 1, example 1-3)

| Classifier Type (New index #) | Classifier Mask (B0-B6 used, B7 reserved) | Frame Control Match Spec. |
|---|---|---| octets: 1 | 1 | 1 or 2 or 3 or 4

- New Frame Classifier field of TCLAS element format (e.g., design option 1, example 2)

| Classifier Type (New index #) | Classifier Mask (B0-B6 used, B7 reserved) | Frame Control Match Spec. | Address 1 Match Spec. |
|---|---|---|---| octets: 1 | 1 | 1 or 2 or 3 or 4 | 6

- New Frame Classifier field of TCLAS element format (e.g., design option 1, example 3)

| Classifier Type (New index #) | Classifier Mask (B0-B6 used, B7 reserved) | Frame Control Match Spec. | Address 1 Match Spec. |
|---|---|---|---| octets: 1 | 1 | 1 or 2 or 3 or 4 | 6

- New Frame Classifier field of TCLAS element format (e.g., design option 1, example 4)

| Classifier Type (New index #) | Classifier Mask (1111 1111 1000 0000) | Frame Control Match Spec. | Duration/ ID Match Spec. | Address 1 Match Spec. | Address 2 Match Spec. | Address 3 Match Spec. | Seq. Control Match Spec. | Address 4 Match Spec. | QoS Control Match Spec. | HT Control Match Spec. |
|---|---|---|---|---|---|---|---|---|---|---|
| 1 | 2 | 1 or 2 or other values | 2 | 6 | 6 | 6 | 2 | 6 | 2 | 4 | octets:      fixed length: 2 octets

- New Frame Classifier of TCLAS element format (e.g., design option 2, example 1)

| Classifier Type (New index #) | Classifier Mask (1011 0000 1000 0000) | Frame Control Match Spec. | Duration/ ID Match Spec. | Address 1 Match Spec. | Address 2 Match Spec. |
|---|---|---|---|---|---|
| 1 | 2 | 1 or 2 or other values | 2 | 6 | 6 | octets:      fixed length: 2 octets

- New Frame Classifier of TCLAS element format (e.g., design option 2, example 2)

| Classifier Type (New index #) | Classifier Mask (0010 0000 1000 0000) | Address 1 Match Spec. |
|---|---|---|
| 1 | 2 | 6 | octets:      fixed length: 2 octets

- New Frame Classifier of TCLAS element format (e.g., design option 2, example 3)

| processing subfield value | meaning |
|---|---|
| 0 | Incoming MSDU's higher layer parameters have to match to the parameters in all the associated TCLAS elements |
| 1 | Incoming MSDU's higher layer parameters have to match to at least one of the associated TCLAS elements |
| 3 (new) | Incoming MSDUs that do not belong to any other TS are classified to the TS for which this TCLAS processing elements is used. In this case, there are not any associated TCLAS elements |
| 4 (new) | Parameters of frames being processed by the classification function have to match to the parameters in all the associated TCLAS elements |
| 5 (new) | Parameters of frames being processed by the classification function have to match to the parameters in all the associated TCLAS elements |
| 6-255 | Reserved |

- revised encoding of processing subfield

| Subelement ID | Length | TCLAS element |
|---|---|---| octets: 1 — 1 — variable

- TFS Subelement format

| Subelement ID | Length | TCLAS element_1 | TCLAS element_2 | TCLAS processing element |
|---|---|---|---|---|
| 1 | 1 | variable | variable | 3 | octets:

- TFS Subelement format (e.g., to establish classification agreement)

| Address2 Match Spec. | Address2 Filter Mask |
|---|---|
| 6 | 0 or 6 | octets:

- Address2 Match Spec. subfield format

| Address3 Match Spec. | Address3 Filter Mask |
|---|---|
| 6 | 0 or 6 | octets:

- Address3 Match Spec. subfield format

| Seq. Control Spec. | Seq. Control Filter Mask |
|---|---|
| 2 | 0 or 6 | octets:

- Seq. Control Match Spec. subfield format

| Address4 Match Spec. | Address4 Filter Mask |
|---|---|
| 6 | 0 or 6 | octets:

- Address4 Match Spec. subfield format

| QoS Control Match Spec. | QoS Control Filter Mask |
|---|---|
| 2 | 0 or 2 | octets:

- QoS Control Match Spec. subfield format

| HT Control Match Spec. | HT Control Filter Mask |
|---|---|
| 4 | 0 or 4 | octets:

- HT Control Match Spec. subfield format

| Source Port Match Spec. | Source Port Filter Mask |
|---|---|
| 2 | 0 or 2 | octets:

• MAC payload field bit masking

FIG. 38

MAC HEADER BASED TRAFFIC CLASSIFICATION AND METHODS FOR USE THEREWITH

CROSS REFERENCE TO RELATED PATENTS/PATENT APPLICATIONS

The present U.S. Utility Patent Application claims priority pursuant to 35 U.S.C. §120 as a continuation of U.S. Utility application Ser. No. 13/855,095, entitled "MAC HEADER BASED TRAFFIC CLASSIFICATION AND METHODS FOR USE THEREWITH", filed Apr. 2, 2013, issued as U.S. Pat. No. 9,119,129 on Aug. 25, 2015, which claims priority pursuant to 35 U.S.C. §119(e) to U.S. Provisional Application No. 61/643,244, entitled "MAC HEADER CONTENT BASED TRAFFIC CLASSIFICATION FOR FRAME FILTERING AND OTHER USES WITHIN SINGLE USER, MULTIPLE USER, MULTIPLE ACCESS, AND/OR MIMO WIRELESS COMMUNICATIONS," filed May 5, 2012; U.S. Provisional Application No. 61/669,114, entitled "MAC HEADER CONTENT BASED TRAFFIC CLASSIFICATION FOR FRAME FILTERING AND OTHER USES WITHIN SINGLE USER, MULTIPLE USER, MULTIPLE ACCESS, AND/OR MIMO WIRELESS COMMUNICATIONS," filed Jul. 8, 2012; U.S. Provisional Application No. 61/770,663, entitled "MAC HEADER BASED TRAFFIC CLASSIFICATION AND METHODS FOR USE THEREWITH," filed Feb. 28, 2013; and U.S. Provisional Application No. 61/770,710, entitled "FILTER AND CLASSIFICATION AGREEMENT FOR MAC HEADER BASED TRAFFIC CLASSIFICATION AND METHODS FOR USE THEREWITH," filed Feb. 28, 2013, all of which are hereby incorporated herein by reference in their entirety and made part of the present U.S. Utility Patent Application for all purposes.

BACKGROUND OF THE INVENTION

1. Technical Field of the Invention

The invention relates generally to communication systems; and, more particularly, it relates to selective coding within single user, multiple user, multiple access, and/or MIMO wireless communications.

2. Description of Related Art

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

BRIEF DESCRIPTION OF THE SEVERAL VIEWS OF THE DRAWINGS

FIGS. 6-9 illustrate various embodiments of wireless local area network (WLAN) frame MAC header—frame types—valid type and subtype combinations.

FIGS. 10 and 11 illustrate various embodiments of control frame extension.

FIGS. 12 and 13 illustrate various embodiments of to/from DS combinations in frames.

FIG. 17 illustrates an embodiment of TFS Request subelements.

FIG. 18 illustrates an embodiment of a Traffic Classification (TCLAS) Processing element.

FIG. 19 illustrates an embodiment of existing Encoding of Processing subfield.

FIG. 21 illustrates an embodiment of Frame Classifier type.

FIG. 23 illustrates various other embodiments of New Frame Classifier field of TCLAS element format.

FIG. 25 illustrates other embodiments of New Frame Classifier field of TCLAS element format.

FIG. 28 illustrates an embodiment of revised encoding of processing subfield.

FIG. 30 illustrates an embodiment of TFS Subelement format.

FIG. 32 illustrates an embodiment of TFS Subelement format (e.g., to establish classification agreement).

FIG. 37 illustrates an embodiment of various embodiments of Address 2 Match Specification subfield format, Address 3 Match Specification subfield format, Sequence Control Match Specification subfield format, Quality of Service (QoS) Match Specification subfield format, and High Throughput (HT) Match Specification subfield format.

FIG. 38 illustrates an embodiment of source port match specification subfield format.

DETAILED DESCRIPTION OF THE INVENTION

Figure 1:
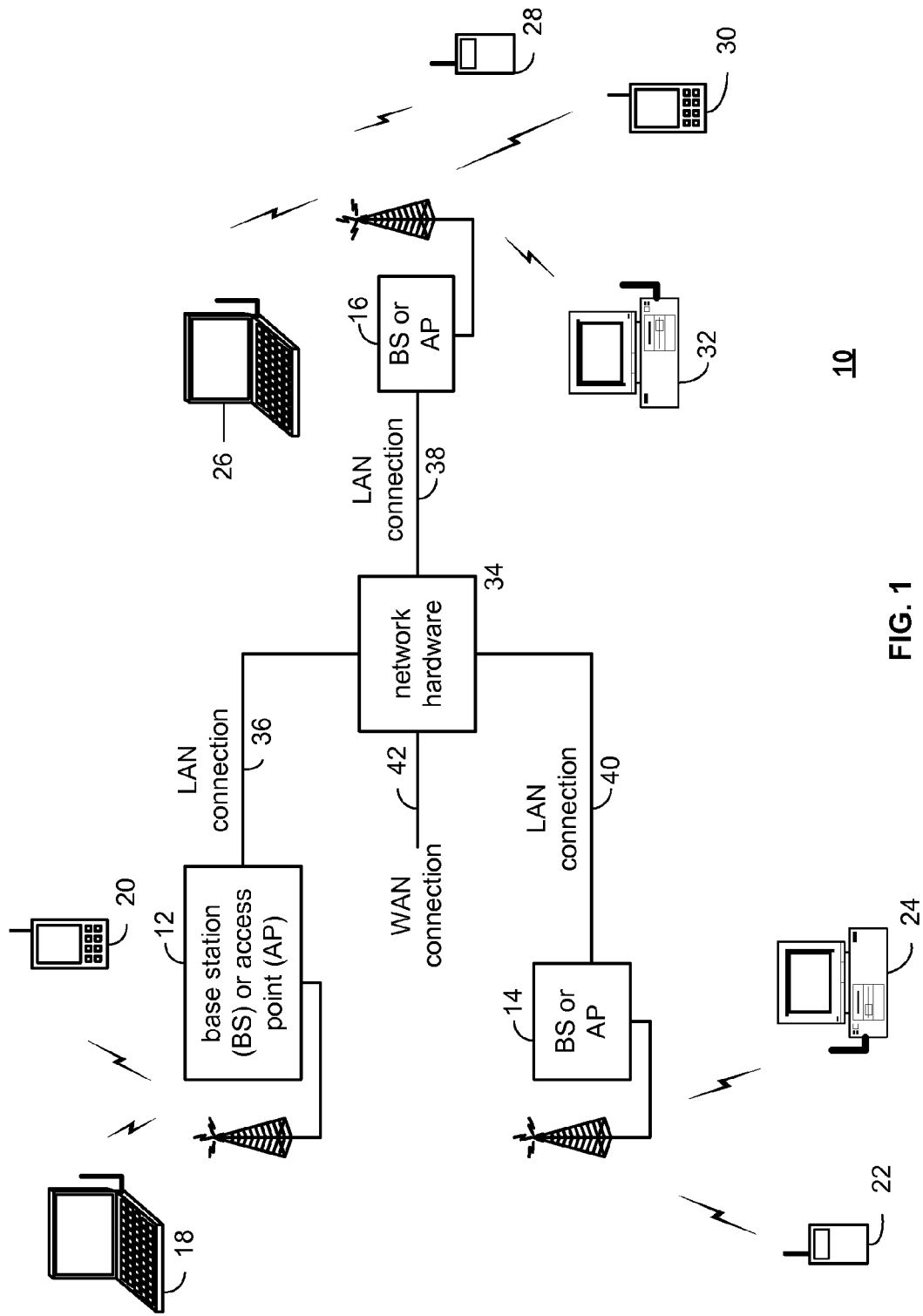
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
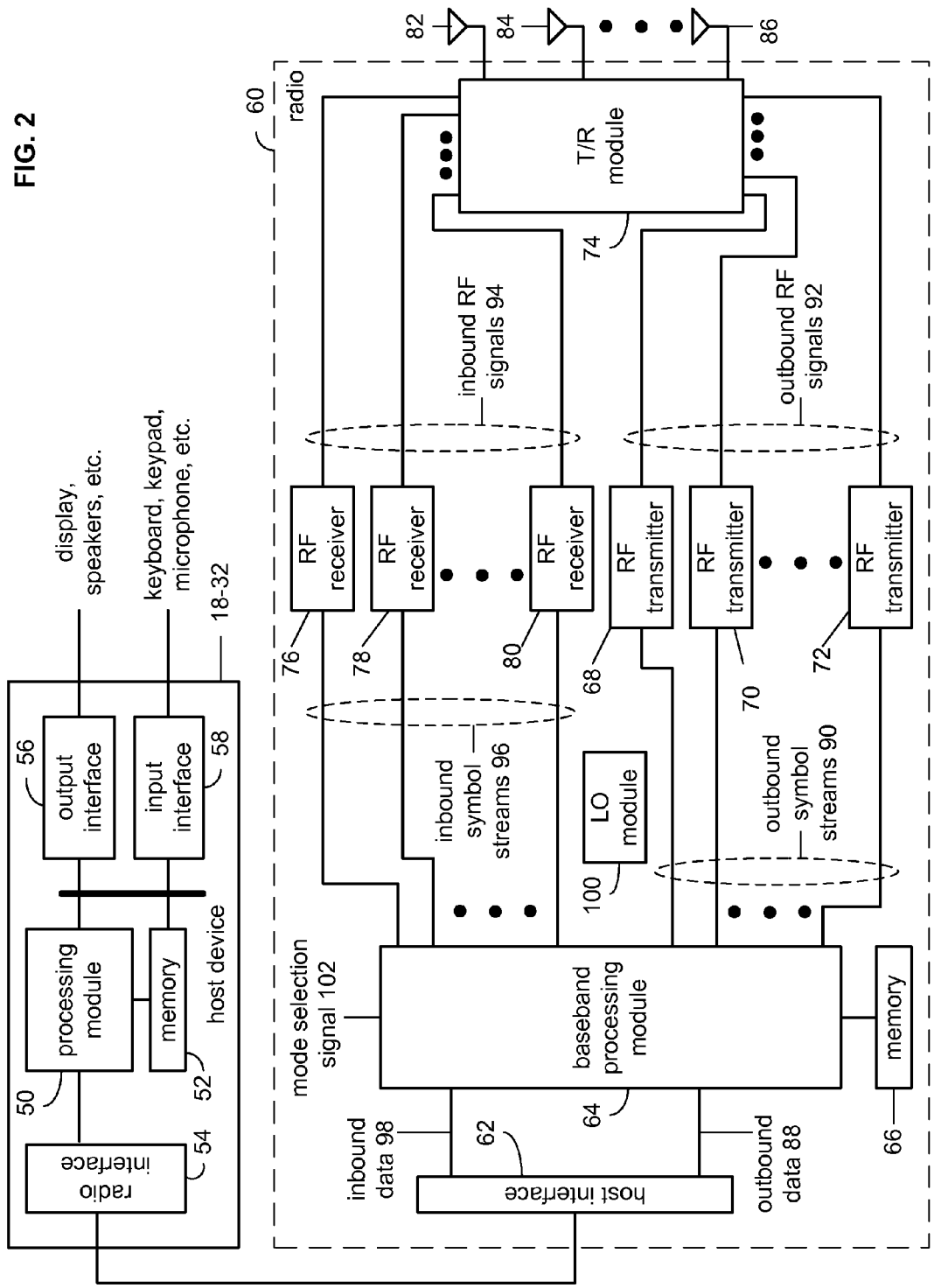
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. In operation, the radio 60 receives outbound data 88 from the host device via the host interface 62. The baseband processing module 64 receives the outbound data 88 and, based on a mode selection signal 102, produces one or more outbound symbol streams 90.

The baseband processing module 64, based on the mode selection signal 102 produces the one or more outbound symbol streams 90 from the outbound data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the outbound data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 receives the inbound symbol streams 96 and converts them into inbound data 98, which is provided to the host device 18-32 via the host interface 62.

Figure 3:
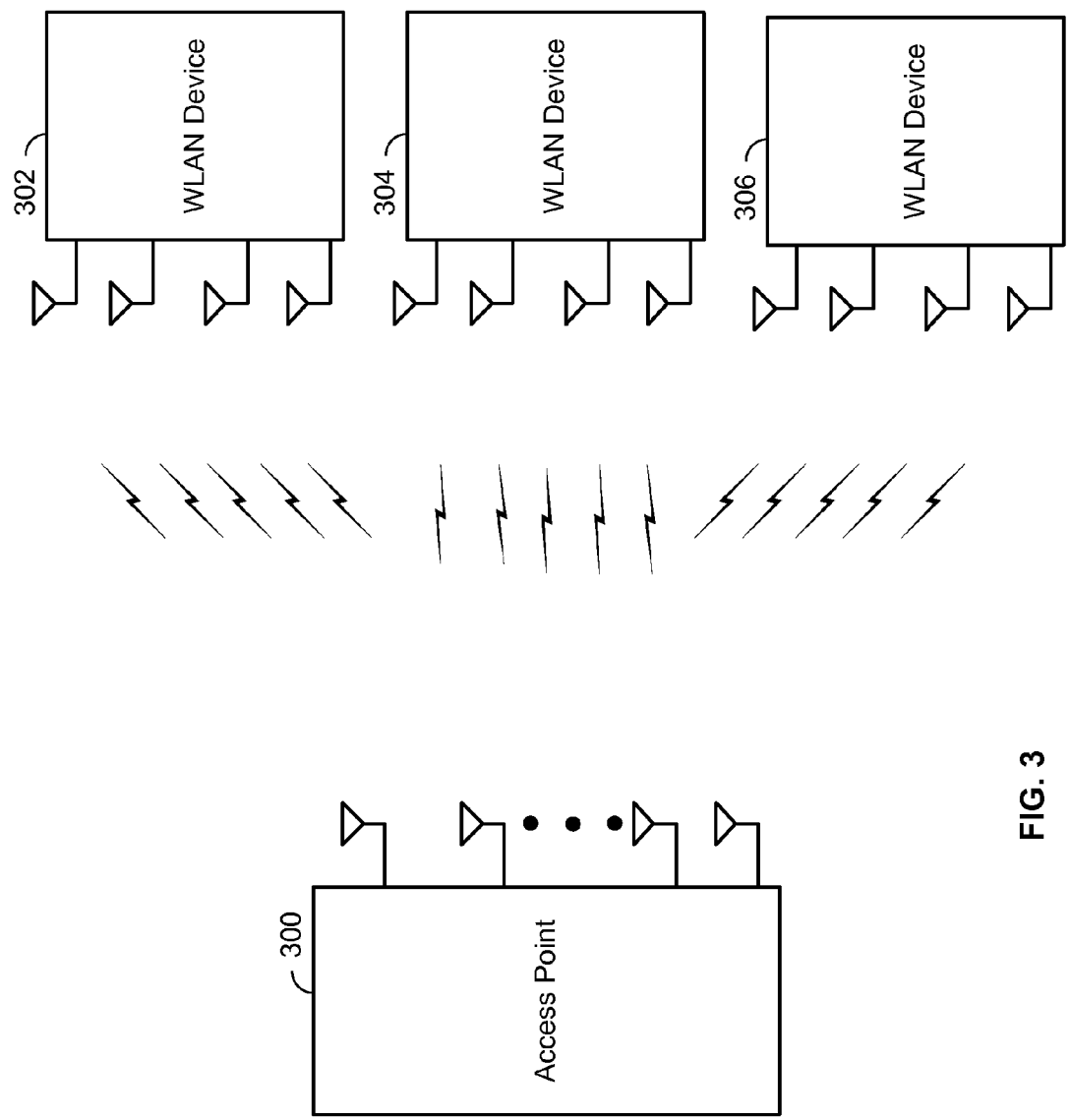
FIG. 3 is a diagram illustrating an embodiment of an access point (AP) and multiple wireless local area network (WLAN) devices operating according to one or more various aspects and/or embodiments of the invention.

FIG. 3 is a diagram illustrating an embodiment of an access point (AP) and multiple wireless local area network (WLAN) devices operating according to one or more various aspects and/or embodiments of the invention. The access point 300 may be compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 300 supports communications with the WLAN devices 302, 304, and 306 with channel bandwidths, MIMO dimensions, and at data throughput rates unsupported by the prior IEEE 802.11x operating standards. For example, the access point 300 and WLAN devices 302, 304, and 306 may support channel bandwidths from those of prior version devices. The access point 300 and WLAN devices 302, 304, and 306 support MIMO dimensions to 4×4 and greater. With these characteristics, the access point 300 and WLAN devices 302, 304, and 306 may support data throughput rates up to 1 GHz and above.

The AP 300 may support simultaneous communications with more than one of the WLAN devices 302, 304, and 306. Simultaneous communications may be serviced via OFDM tone allocations (e.g., certain number of OFDM tones in a given cluster), MIMO dimension multiplexing, or via other techniques. With some simultaneous communications, the AP 300 may allocate one or more of the multiple antennas thereof respectively to support communication with each WLAN device 302, 304, and 306, for example.

Further, the AP 300 and WLAN devices 302, 304, and 306 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Frame classification and filtering may be employed within a communication system, network, etc. (e.g., such as a wireless local area network (WLAN) and/or any other type of network including wired networks, optical networks, etc. including those which may have respective communication links implemented using various technologies, communication media, etc. as well as those in which different respective communication links therein may be implemented using different technologies [e.g., some communication links wireless, some communication links wired, some communication links optical, etc.]), classification of communications therein may be viewed as identifying a communication based on various characteristics to identify those communications as being one of any of a number of types of communications.

With respect to traffic classification and filtering within any such type of communication system, network, etc., traffic classification may be viewed as classification of frames based on a set of pre-established parameters. For example, the one or more parameters or set of parameters is called a classifier. A frame matching the classifier is called a matched frame.

With respect to traffic filtering, traffic filtering may be described as being a type of frame processing wherein traffic classification is established, and the frames not matching the classifier are filtered out and not transmitted to a given communication device (e.g., a wireless station (STA), an access point (AP), etc. in the context of a wireless mediation system) with which a classification and filter agreement exists.

Such traffic filtering may be performed for a variety of reasons. For example, such traffic filtering may be performed to reduce excessive network traffic (e.g., redundant or low priority traffic), which may consequently reduce network congestion and improve network performance. Also, such traffic filtering may be performed to improve the performance of devices in power save, because only the traffic of highest interest is either queued and transmitted immediately or buffered for later delivery to a communication device (e.g., a STA).

For example, a communication device (e.g., a STA) may be implemented to indicate the traffic of interest by setting up a corresponding traffic classification and filtering agreement.

In addition to traffic filtering, traffic classification can also enable other special frame processing, e.g., bandwidth reservation, etc.

In accordance with classification as performed currently within IEEE Std 802.11™—2012 (incorporated by reference herein), traffic classification is enabled and based on the content of the media access control (MAC) payload of a frame, but not on the content of the MAC header of a frame. For example, each MAC frame consists of the following basic components:

A MAC header, which comprises frame control, duration, address, optional sequence control information, optional QoS Control information (QoS data frames only) and optional HT Control fields (+HTC frame only);

A variable-length frame body (i.e., MAC payload plus security overhead), which contains information specific to the frame type and subtype;

A FCS (frame control sequence), which contains an IEEE 32-bit CRC.

Consequently, such filtering can only be established based on the MAC payload content, but not on the MAC header content, thus, filtering can only be established for DATA frames, and IEEE Std 802.11™—2012 (incorporated by reference herein) currently does not include any mechanism to set up one or more filters to filter other frame types, such as Management frames or Control frames or Extension frames. As such, in accordance with IEEE Std 802.11™—2012 (incorporated by reference herein), filtering based on other MAC header content, such as MAC addresses, etc., is not possible. In an embodiment, a communication device such as a STA, AP or other device includes at least one transceiver to support communication with at least one additional apparatus such as a STA, AP or other device. A baseband processing module generates communications between the apparatus and the at least one additional apparatus utilizing a filter and classification agreement that indicates at least a portion of MAC header content of a frame is used for frame classification. After such a filter and classification agreement, the indicated portion of media access control (MAC) header content of frames can be used to classify the frame of one of a plurality of frame types. Such a classification can be used to filter frames that would otherwise be destined to the additional apparatus or for other processing. Further details including several optional functions and features are described in conjunction with FIGS. 4-41 that follow.

Figure 4:
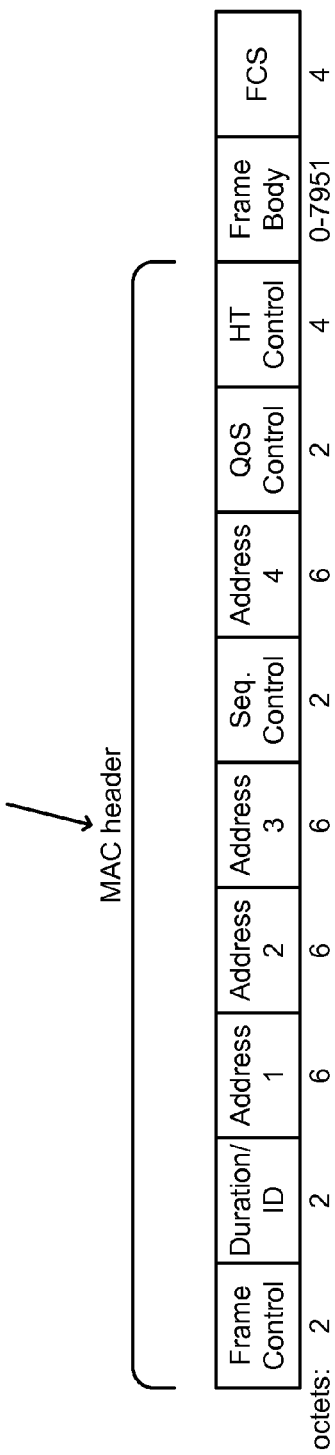
FIG. 4 illustrates an embodiment of a WLAN media access control (MAC) frame format.

FIG. 4 illustrates an embodiment 400 of a WLAN media access control (MAC) frame format. Herein, a mechanism is provided by which frame classification may be performed based on the content of the MAC Header in order to enable desired filtering, and/or other processing, of frames based on their MAC Header content. Generally speaking, any one or more portions (e.g., one or more fields, one or more subfields, etc.) of the MAC header may be employed for performing classification, filtering, and/or other processing. This diagram generally shows a MAC frame format including a MAC header, frame body, and FCS.

Figure 5:
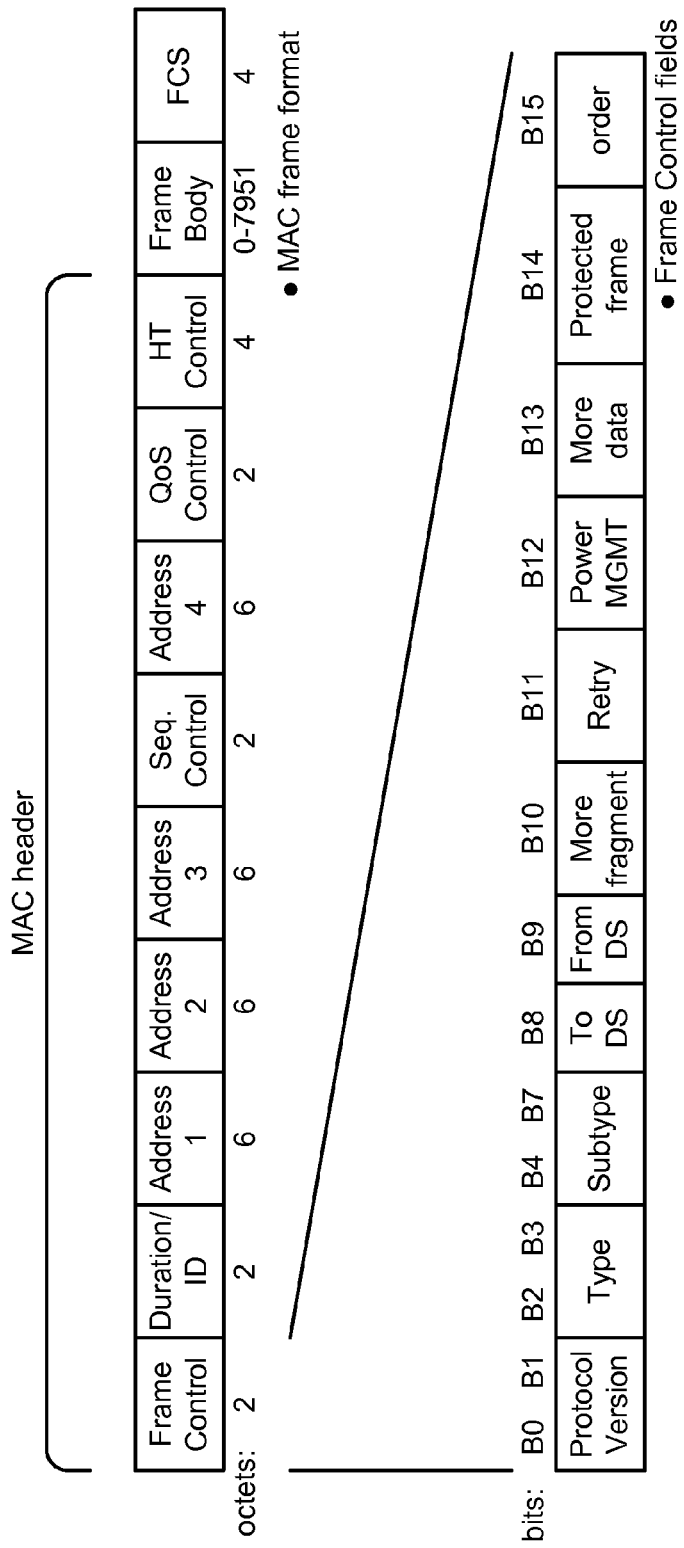
FIG. 5 illustrates an embodiment of a WLAN MAC frame format and sub-fields of a frame control field thereof.

FIG. 5 illustrates an embodiment 500 of a MAC frame format and sub-fields of a frame control field thereof. With respect to the frame header format of a WLAN Frame, such a WLAN MAC Header may be described as including: Frame Control, Duration/ID, Address~4, Address~2, Address~3, Sequence Control, Address~4, QoS Control, HT Control, Frame Body and FCS. Within such a MAC header, the Frame Control field may be described as including: Protocol version, Type, Subtype, ToDS, FromDS, MoreFragments, Retry, Power Management, More data, Protected Frame and Order. Generally speaking, such a WLAN MAC header contains useful information for frame classification, which in turn enables special frame processing (e.g. filtering).

FIGS. 6-9 illustrate various embodiments (shown by reference numerals 600, 700, 800, and 900) of wireless local area network (WLAN) frame MAC header—frame types—valid type and subtype combinations. FIG. 10 and FIG. 11 illustrate various embodiments (shown by reference numerals 1000 and 1100) of control frame extension.

For example, in accordance with performing classification based on WLAN Frame MAC Header content, different respective frame types may be appropriately classified. WLAN frames may be viewed as being categorized into four respective types: DATA frames, Management frames, Control frames, and Extension frames. With respect to Extension frames, it is noted that such frame types are not currently included in IEEE Std 802.11™—2012 (incorporated by reference herein), but they are nonetheless included in proposed amendment IEEE P802.11Ad™/D6.0 (incorporated by reference herein). The combination of Type and Subtype in Frame Control subfield in MAC header indicates the frame type (as shown in FIGS. 6-11).

FIG. 12 and FIG. 13 illustrate various embodiments (shown by reference numerals 1200 and 1300) of to/from DS combinations in frames. With respect to From DS/To DS Indication in view of such WLAN Frame MAC Header, the meanings of From DS/To DS values are described in Table 4 in IEEE Std 802.11™—2012 (incorporated by reference herein).

As may be seen with respect to FIG. 13, the meanings of From DS/To DS values are modified from the content of Table 4 in IEEE Std 802.11™—2012 (incorporated by reference herein) to the content of Table 5 by proposed amendment IEEE P802.11Ad™/D6.0 (incorporated by reference herein). The meanings of various other fields and their subfields of MAC Header are specified in IEEE Std 802.11™—2012 (incorporated by reference herein).

Figure 14:
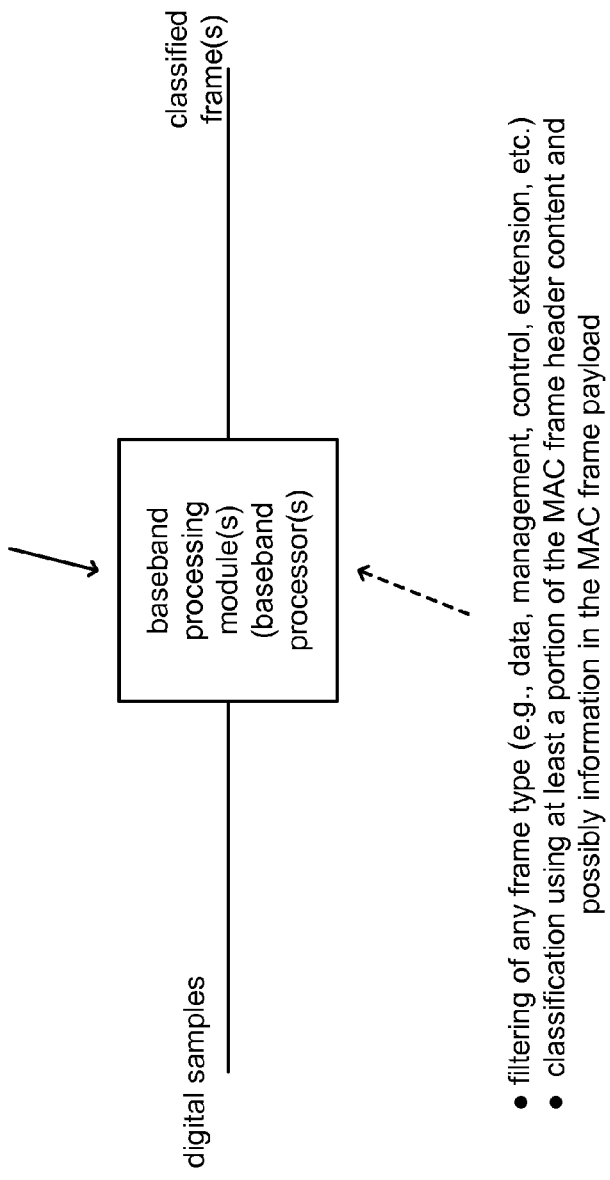
FIG. 14 illustrates an embodiment of at least one classification device.

FIG. 14 illustrates an embodiment 1400 of at least one classification device. Information contained in the WLAN Frame MAC header is useful and may be employed frame classification and subsequent processing. As may be understood with respect to the various diagrams and/or embodiments herein, appropriate classification may be made based on MAC header content. For example, traffic classification may be performed based on the MAC header content to allow for classification of Management and Control frames, and other frame types (e.g., Extension frame types).

Such classification may be performed based on Frame Type and Subtype in the MAC header and solves the existing problem that frames of non-data frame type cannot be classified and subsequently processed (e.g., filtered). In accordance with any one or more of the various aspects, embodiments, and/or their equivalents, of the invention, the values of Frame Type, and Subframe Type, and/or their combination can be used to indicate the specific types of frames to be classified and subsequently processed (e.g., filtered). Classification of frames may also be based on other information (e.g., address) in the frame MAC header. Other special processing may be performed on the classified frames based upon their appropriate classification.

Although the prior classification methods allow the classification of Data frame type based on the MAC payload content, various aspects, embodiments, and/or their equivalents, of the invention enable classification of Data frame type based on MAC header content, or the combination of the contents of MAC header and MAC payload.

The classification based on the MAC header content can either be used separately or be combined with other methods of classification—for example, in conjunction with the existing classification based on the MAC Payload content, as described in IEEE Std 802.11™—2012 (incorporated by reference herein). In addition, it is noted that such classification may be performed with respect to any type of communication system. For example, such classification may be performed with respect to any and all WLAN (wireless LAN) operational bands (e.g., 2.4 GHz, 5 GHz, 60 GHz, 900 MHz, or TV white space). Again, however, generally speaking, such classification may be performed with respect to any type of communication system implemented using any type of communication media, any type of communication devices, etc.

For example, with respect to various implementations of WLAN topologies, such classification may be performed generally and is applicable to any topology, such as Infrastructure BSS (Basic Service Set), IBSS (Independent Basic Service Set), mesh, WiFi Direct.

An initiating communication device (e.g., a STA) can communicate/negotiate a traffic classification agreement with the peer communication device (e.g., a STA) (where classification and subsequent frame processing is to be performed). Upon receiving a new classification request, the peer communication device (e.g., a STA) can accept, refuse, or override the received request. A classification agreement can be terminated either by a communication device (e.g., a STA) that initiated the classification agreement, or by a communication device (e.g., a STA) that accepted the classification request.

In an infrastructure BSS, a non-AP STA typically is the communication device (e.g., a STA) that initiates/requests the establishment of the classification agreement, and an AP STA typically is the communication device (e.g., a STA) that accepts the classification requests and performs the frame classification and the subsequent processing (e.g., filtering). However, depending on the usage scenario and the topology, the communication device (e.g., a STA) that initiates/requests to set up the classification and the subsequent frame processing (e.g., frame filtering) agreement can be an non-AP (Access Point) STA, or an AP-STA, or a mesh-STA, etc. Also, depending on the usage scenario and the topology, the communication device (e.g., a STA) that accepts the classification requests and performs the classification and the subsequent frame processing (e.g., frame filtering) can be a non-AP STA, or an AP-STA or a mesh-STA, etc. In addition to be applicable to the WLAN technology and system, various aspects, embodiments, and/or their equivalents, of the invention are also available to other technologies and systems to perform traffic classification and the subsequent processing (e.g., filtering) based on the content of the MAC Header.

With respect to the operation of any such device (e.g., such as one or more baseband processing modules or one or more baseband processors, among other devices which may be implemented to perform classification), the setup of such a classifier may be described in conjunction with any of the following methods.

Method~1—

Frame classifier is established using the TCLAS information element (IE), with the newly designed Frame Classifier(s) included in the TCLAS element, the revised User Priority field of the TCLAS element, and the revised TCLAS Processing element. For example, add one or more new Classifier Types to the "Frame Classifier" field of the "TCLAS" information element (IE) that is defined in IEEE Std 802.11™—2012 (incorporated by reference herein). Revise the User Priority field of the TCLAS element in IEEE Std 80211™—2012 (incorporated by reference herein) and revise the TCLAS Processing element in IEEE Std 802.11™—2012 (incorporated by reference herein). Further details including several optional functions and features are described in conjunction with FIGS. 26-28 and 30-41 and the respective associated written description.

Method~2—

Frame classifier is established by including the classifying parameters in a new IE and frames. For example, create new specific IEs and/or frames (e.g., new management request and management response frames) to convey the classification parameters. Further details including several optional functions and features are described in conjunction with FIG. 29 and the respective associated written description.

In addition to Method~4 and Method~2 described above, the Frame classifier can optionally be established by piggybacking the classifying parameters onto existing IE and/or frame exchanges currently used for other purposes. In addition, the Frame classifier can be established using other methods that identify the content of one or more portions of the MAC header, and possibly of a portion of the MAC payload, which are to be used for frame classification.

Figure 15:
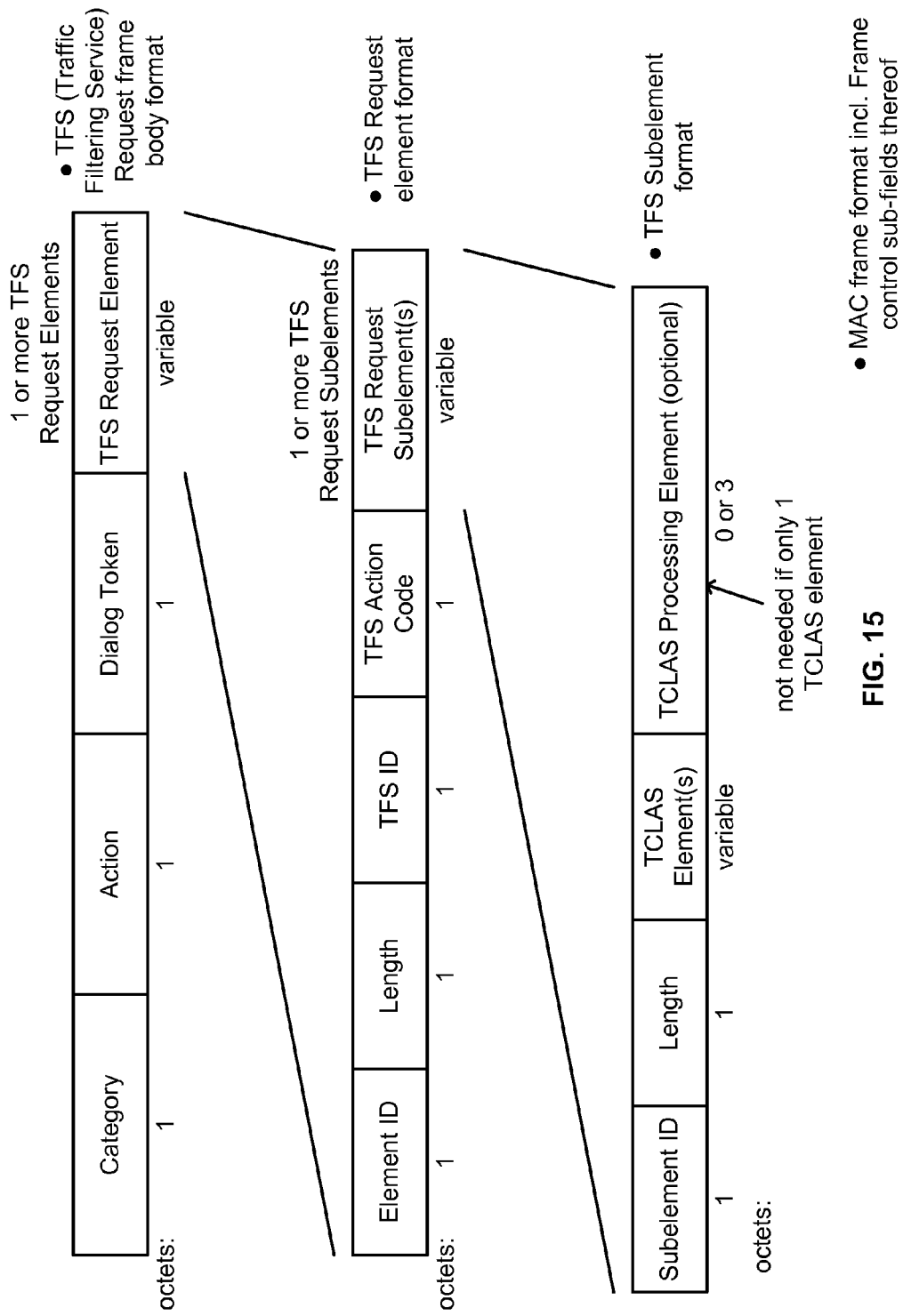
FIG. 15 illustrates an embodiment of TFS (Traffic Filtering Service) Request frame body format, TFS Request element format, and TFS Subelement format.

FIG. 15 illustrates an embodiment 1500 of TFS (Traffic Filtering Service) Request frame body format, TFS Request element format, and TFS Subelement format. In IEEE Std 802.11™—2012 (incorporated by reference herein), the TCLAS IE contains the classification parameters, and a TCLAS element is included in a management frame (i.e., TFS Request frame), which is used to establish a classification agreement, as illustrated in FIGS. 15-21.

Figure 16:
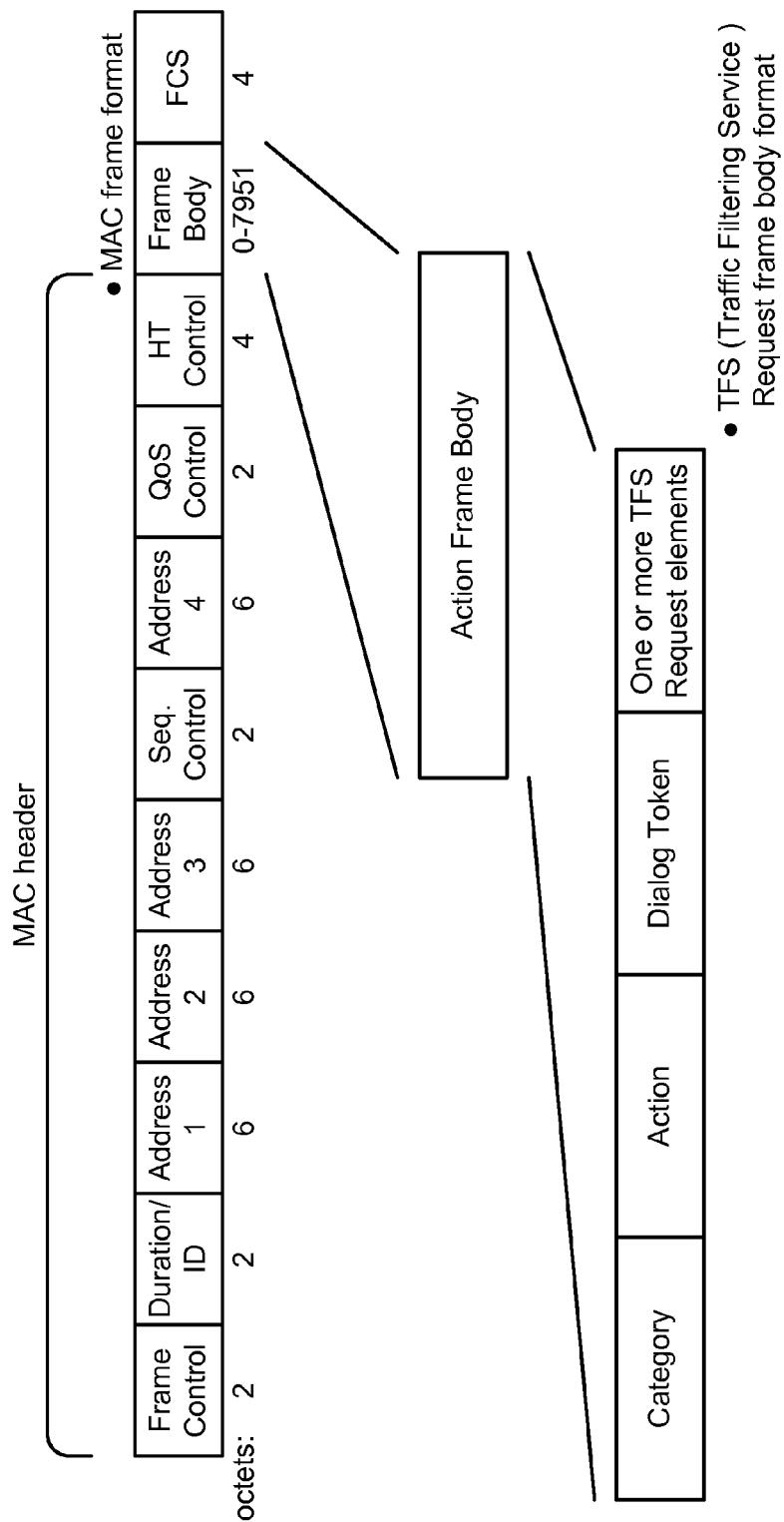
FIG. 16 illustrates an embodiment of MAC frame format and TFS Request frame body format.

FIG. 16 illustrates an embodiment 1600 of MAC frame format and TFS Request frame body format. A New Frame Classifier Type may be defined for the TCLAS Element. For example, of the different respective frame types, a TFS Request frame is a Management frame.

FIG. 17 illustrates an embodiment 1700 of TFS Request subelements. In accordance with certain types of classification, a TFS Request frame's TFS Request element contains one or more TFS Request subelements, which may contain the subelements listed in the Table of FIG. 17. The TFS subelement contains the TCLAS element.

In certain types of classification, different types of classification parameters are organized into the TCLAS element's different Frame Classifiers, whose Classifier Type subfield contains the Classifier index, and whose Classifier Mask subfield specifies a bitmap in which bits that have the value 1 identify a subset of the classifier parameters whose values need to match those of the corresponding parameters in a given frame. The bitmap is ordered from the LSB (least significant bit) to the MSB (most significant bit), with each bit pointing to one of the classifier parameters of the same relative position within the MAC header as the relative position of the bit within the bitmap, based on Classifier Type. In cases where there are more bits in the bitmap than classifier parameters that follow, the MSBs that do not correspond to any classifier parameters are reserved. The Classifier Parameters subfield contains the specific parameters (e.g., address) contained in a frame that need to be matched.

Figure 20:
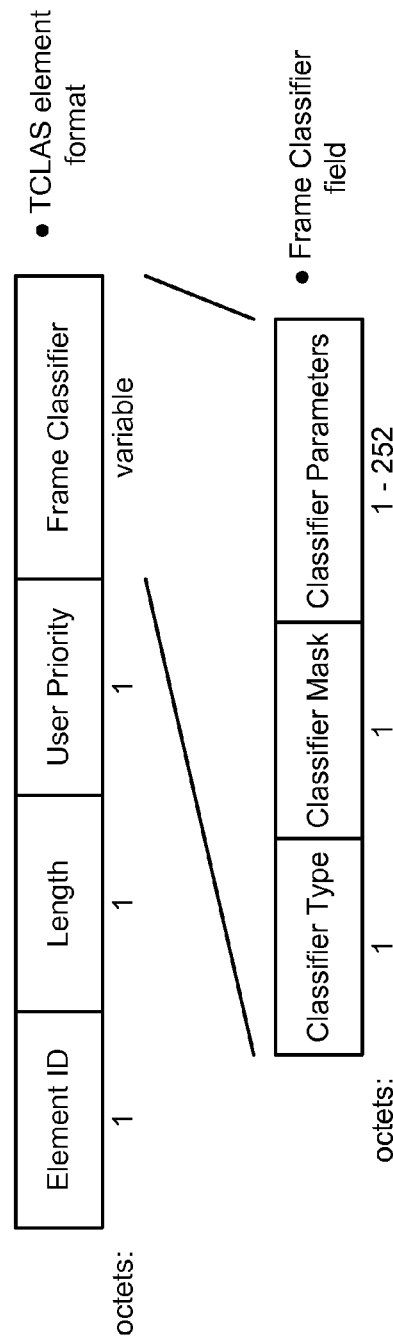
FIG. 20 illustrates an embodiment of TCLAS element format and Frame Classifier field thereof.

FIG. 18 illustrates an embodiment 1800 of a Traffic Classification (TCLAS) Processing element, FIG. 19 illustrates an embodiment 1900 of Encoding of Processing subfield, and FIG. 20 illustrates an embodiment 2000 of TCLAS element format and Frame Classifier field thereof.

FIG. 21 illustrates an embodiment 2100 of Frame Classifier type. In accordance with any one or more of the various aspects, embodiments, and/or their equivalents, of the invention, a New Frame Classifier Type may be defined for the TCLAS Element. However, in accordance with certain classification approaches, the classification parameters only apply to the content of WLAN frame MAC payload, but not to the MAC header, as shown in previous Table and/or diagrams herein, and other relevant text in IEEE Std 802.11™—2012 (incorporated by reference herein).

Herein, a novel approach is presented that can provide for, among other things, New Classify Type(s) for the TCLAS IE so that it can contain classification parameters that are based on the MAC Header content; the new Classifier Type(s) use a previously reserved number for Classifier Type.

Also, such novel classification may operate by revising the User Priority field of the TCLAS element which, in certain implementations, could only contain a meaningful User Priority value associated with a Data frame. Such classification may also operate conjunctively using the use defined in IEEE Std 802.11™—2012 (incorporated by reference herein), the User Priority filed of the TCLAS element can be (a) set to a special value (e.g., 255) to indicate its non-use, or (b) set to a known and fixed value to indicate other special use, e.g., to convey an AC (Access Category) value.

Such novel classification may also operate by revising/ expanding the encoding of the Processing subfield of the TCLAS Processing element so that the TCLAS processing is not limited to classification on Data frames.

Various embodiments of such a new Classifier Type(s) may be implemented using one or more of the following design options:

Option~1

The new Classify Type index number uniquely indicates the exact content of a corresponding Classify Type in terms of the length of the Classify Mask, the type and the order of the match specifications for the fields of the MAC Header included in the Classify Type. For example, a new Classifier Type of value equal to 6 could be used to indicate that the match specifications for fields FC, Address1, Address2, Address3, SEQ, Address4, QoS, HT are all present in the TCLAS element, while a new Classifier Type of value equal to 7 could be used to indicate that only the match specifications for fields Address1, Address2, Address3, Address4 are present.

The content of the Classify Mask field determines which of the fields included in that specific Classify Type need to be compared when processing a frame. The bitmap is ordered from the LSB to the MSB, with each bit pointing to one of the match specifications for the MAC Header fields of the respective relative positions. A bit value of 1 in the Classify Mask field indicates the corresponding field needs to be compared when processing a frame. A bit value of 0 in the Classify Mask field indicates the corresponding filed needs not to be compared (and unused) when processing a frame.

Some embodiments of such a new Classifier Type may use the following design options:

The Classify Mask is either 1 or 2 octets in length. When the number of bits in the Classify Mask is more than the number of the match specifications for the MAC Header fields included in a Classify Type, the MSBs that do not point to any classifier parameters are reserved.

Length of mask can be determined by examining Classifier Type and Length information, and may be increased to a larger value (e.g., 3 or 4 octets) to accommodate possible new MAC Header format(s).

Option~2

Only a single new Classify Type index number is needed if the Frame Control Match Specification subfield is a fixed length and with a fixed content, and Classify Mask is always 2 octets in length, with B0 to B8 being used and B9 to B15 being reserved for future use, with the following exemplary fixed mapping.

B0: Frame Control Match Specification
B1: Duration/ID Match Specification
B2: Address 1 Match Specification
B3: Address 2 Match Specification
B4: Address 3 Match Specification
B5: Sequence Control Match Specification
B6: Address 4 Match Specification
B7: QoS Control Match Specification
B8: HT control Match Specification
B9~B15: Reserved.

The bitmap in Classify Mask is ordered from the LSB to the MSB, with each of the B0 to B8 pointing to one of the match specifications for the MAC Header fields. A bit value is 1 indicates the corresponding match specification for a MAC Header field is present and needs to be compared when processing a frame. A bit value of 0 indicates that the match specification for the MAC Header field is not present.

Additional Classifier Types (and the corresponding index numbers) would be needed in order to signal the presence of different numbers of octets and the exact contents of the Frame Control Match Specification subfield if there were more than one possible size and content for this subfield, with each Classifier Type (and the corresponding index number) corresponding to a specific content and number of octets in the Frame Control Match Specification subfield.

The length of Classifier Mask may be increased from 2 octets to a larger value (e.g. 3 or 4 octets) so there are sufficient reserved bits for future use to accommodate possible new MAC Header formats.

The mapping of the bits in Classifier Mask with the match specifications for the MAC Header fields may be different from the mapping provided above (e.g., B0: Frame Control Match Specification, B1: Duration/ID Match Specification, etc.).

Figure 22:
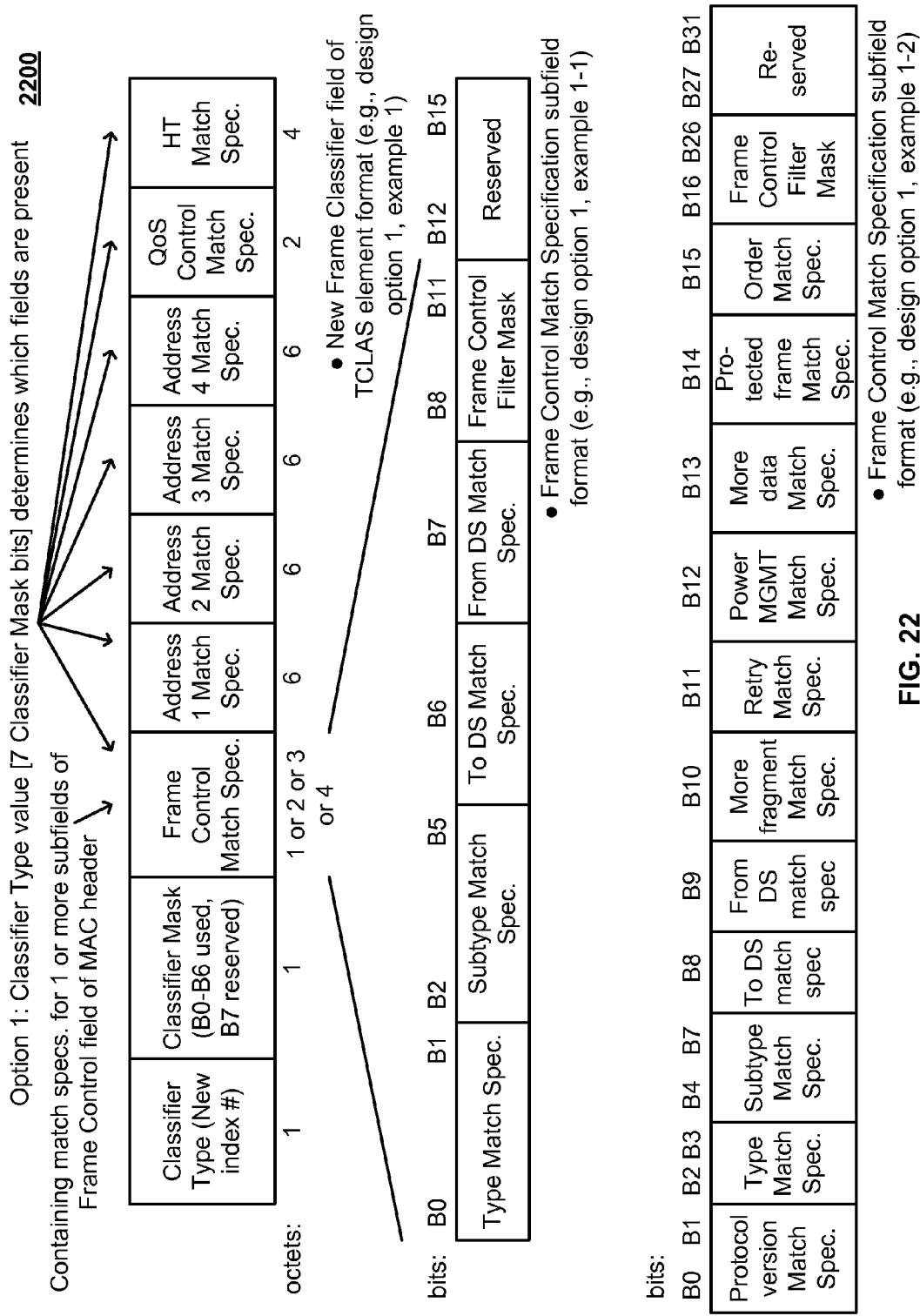
FIG. 22 illustrates an embodiment of New Frame Classifier field of TCLAS element format and some options of Frame Control Match Specification subfield format.

FIG. 22 illustrates an embodiment 2200 of New Frame Classifier field of TCLAS element format and some options of Frame Control Match Specification subfield format. The top portion of FIG. 22 illustrates one design/example of a new Classifier Type using design option~1. The Frame Control Match Specification subfield can be 1, or 2, or other number of octets in length depending on its content.

The middle and bottom portions, respectively, of FIG. 22 are examples of a Frame Control Match Specification subfield of 2-octet length and of 4-octet length, respectively. Frame Control Filter Mask subfield is a bitmap used to indicate which subfields (e.g., Type, Subtype, ToDS, FromDS, etc.) of the Frame Control Match Specification are compared when processing a frame. The bitmap is ordered from the LSB to the MSB, with each bit pointing to one of the Frame Control subfields of the respective relative positions. The number of bits in the Frame Control Filter Mask subfield is the same as the number of the subfields of the Frame Control Match Specification minus 2 (i.e., minus the Frame Control Mask subfield and the Reserved subfield).

FIG. 23 illustrates various other embodiments 2300 of New Frame Classifier field of TCLAS element format. The top portion of FIG. 23 is an example of a Frame Control Match Specification subfield of 2-octet length, but no Frame Control Filter Mask subfield included. Each subfield in the Match Specification needs to be compared when processing a frame. Using the same design principle, the Frame Control Match Specification field can be of other length depending on the number of specific subfields of the Frame Control field included in the Frame Control Match Specification and whether Frame Control Filter Mask subfield being included or not.

The middle and bottom portions, respectively, of FIG. 23 illustrate other designs/examples of a new Classifier Type containing classification parameters based on the content of the Frame Control field and possibly other fields of the MAC Header, using design option~1. Each example would have a different Classifier Type value.

The Frame Control Match Specification field of this exemplary design can be the same as the design illustrated in the middle and bottom portions, respectively, of FIG. 22 or the top portion of FIG. 23 or other design using the same principles.

Figure 24:
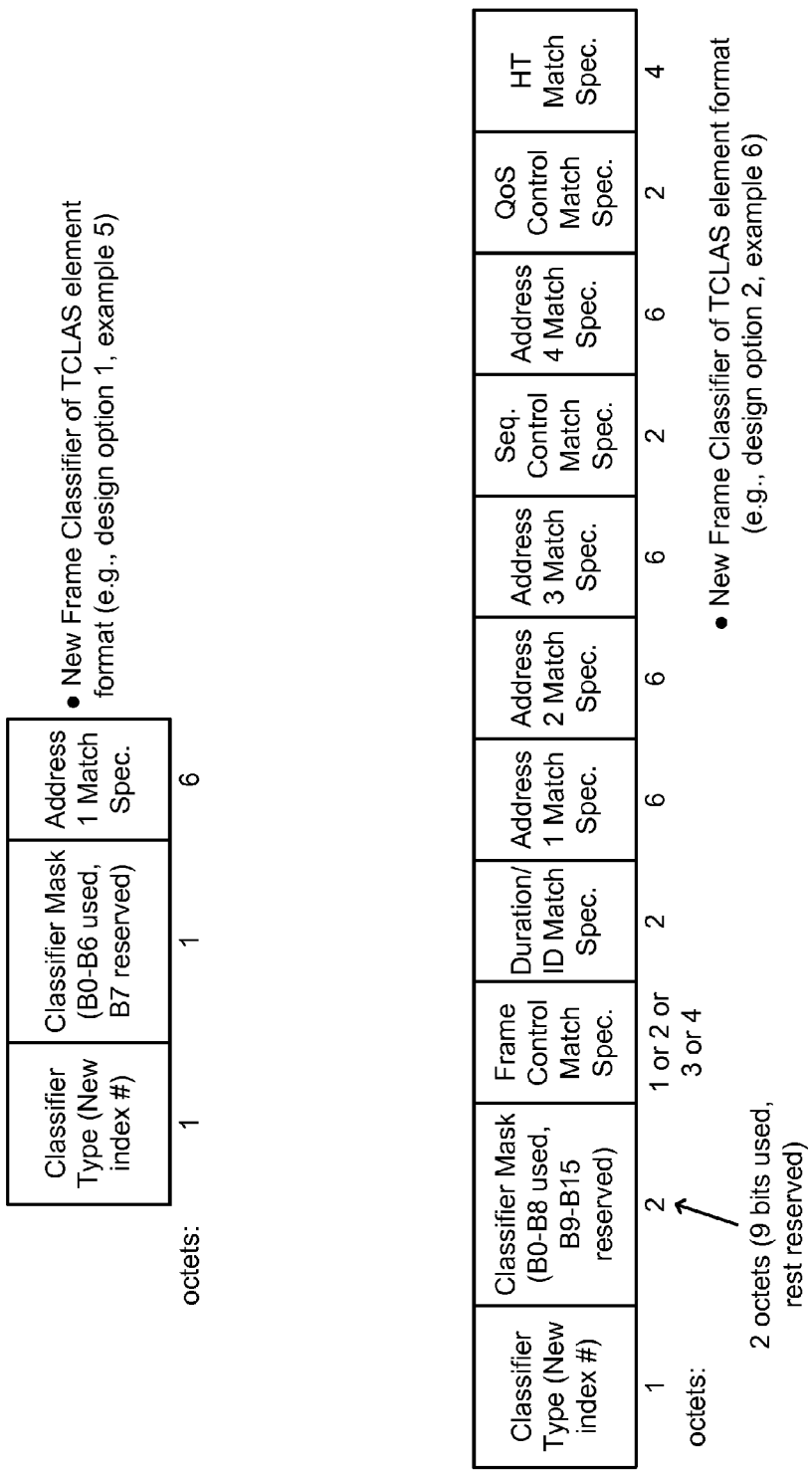
FIG. 24 illustrates other embodiments of New Frame Classifier field of TCLAS element format.

FIG. 24 illustrates other embodiments 2400 of New Frame Classifier field of TCLAS element format. The top portion of FIG. 24 illustrates a design/example of a new Classifier Type that contains classification parameters based on only the content of the Address~4 field of the MAC Header, using design option~4. The bottom portion of FIG. 24 illustrates a design/example of a new Classifier Type that contains classification parameters based on the content of all fields of the MAC Header, using design option~1. In these examples for option~4, the classifier type value is used to determine match specifications for which fields of the MAC header are present.

FIG. 25 illustrates other embodiments 2500 of New Frame Classifier field of TCLAS element format. This different respective portions of this diagram illustrate a design/example of a new Classifier Type, using design option~2. The Frame Control Match Specification field of this exemplary design can be the same as the design illustrated in the middle or bottom portions, respectively, of FIG. 22 or the top portion of FIG. 23 or other design using equivalent or the same principles.

In each of the examples of option~2, there is only one classifier type value for a given fixed length and content of the Frame Control Match Specification subfield and it indicates that match specifications for any MAC header fields might be present—the match specifications for which fields are actually present is determined by examining the classifier Mask bits.

Additional Classifier Types (and the corresponding index numbers) may be employed in order to signal the presence of different numbers of octets and the exact contents of the Frame Control Match Specification subfield if there were more than one possible size and content for this subfield, with each Classifier Type (and the corresponding index number) indicating the exact content and the number of octets of the Frame Control Match Specification subfield.

Figure 26:
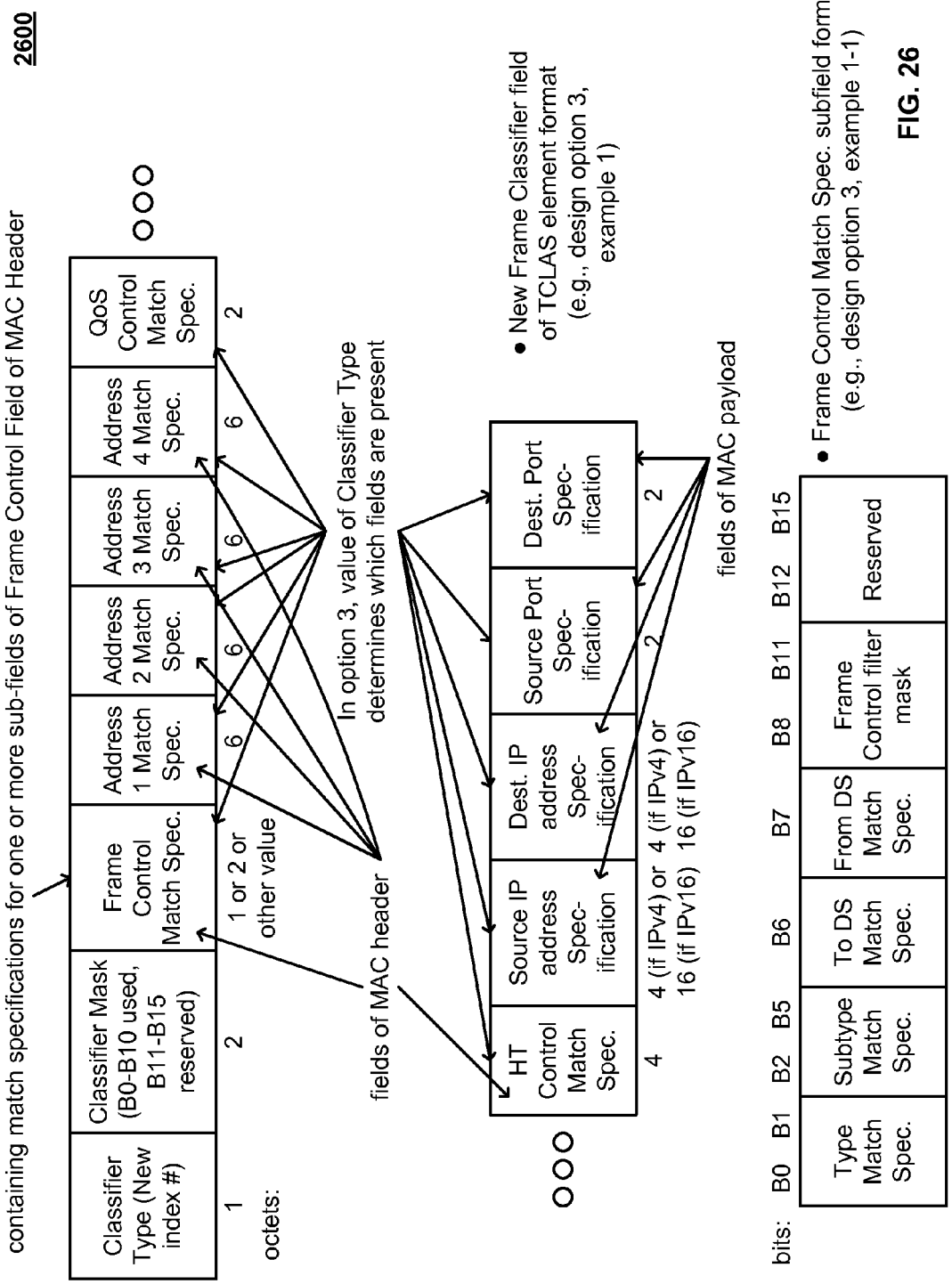
FIG. 26 illustrates an embodiment of a New Classifier Type containing classification parameters based on the content of some fields of the MAC header and mad payload (Option~3).

FIG. 26 illustrates an embodiment 2600 of a New Classifier Type containing classification parameters based on the content of some fields of the MAC header and mad payload (Option~3). With respect to this new Option~3, the new Classify Type index number uniquely indicates the exact content of a corresponding Classify Type in terms of the length of the Classify Mask, the type and the order of the match specifications for the fields of both the MAC Header and the MAC payload included in the Classify Type.

For example, a new Classifier Type of value equal to 6 could be used to indicate that the match specifications for fields FC, Address1, Address2, Address 3, SEQ, Address4, QoS HT, Source IP Address, Destination IP Address, Source Port, Destination Port are all present in the TCLAS element, while a new Classifier Type of value equal to 7 could be used to indicate that only the match specifications for fields Address1, Address2, Source IP Address, Destination IP Address, Source Port, Destination Port are present.

The content of the Classify Mask field determines which of the fields included in that specific Classify Type need to be compared when processing a frame. The bitmap is ordered from the LSB to the MSB, with each bit pointing to one of the match specifications for the MAC Header fields and the MAC payload fields of the respective relative positions. A bit value of 1 in the Classify Mask field indicates the corresponding field needs to be compared when processing a frame.

A bit value of 0 in the Classify Mask field indicates the corresponding filed needs not to be compared (and unused) when processing a frame.

The Classify Mask is either 1 or 2 octets or a large value in length. When the number of bits in the Classify Mask is more than the number of the match specifications for the MAC Header fields and the MAC Payload fields included in a Classify Type, the MSBs that do not point to any classifier parameters are reserved.

The length of mask can be determined by examining Classifier Type and Length information, and may be increased to a larger value (e.g., 3 or 4 octets) to accommodate possible new MAC Header format(s) as well as the MAC Payload fields that need to be compared.

This diagram, FIG. 26, illustrates a design/example of a new Classifier Type containing classification parameters based on the content of some fields of the MAC Header and MAC Payload, using design option~3.

Figure 27:
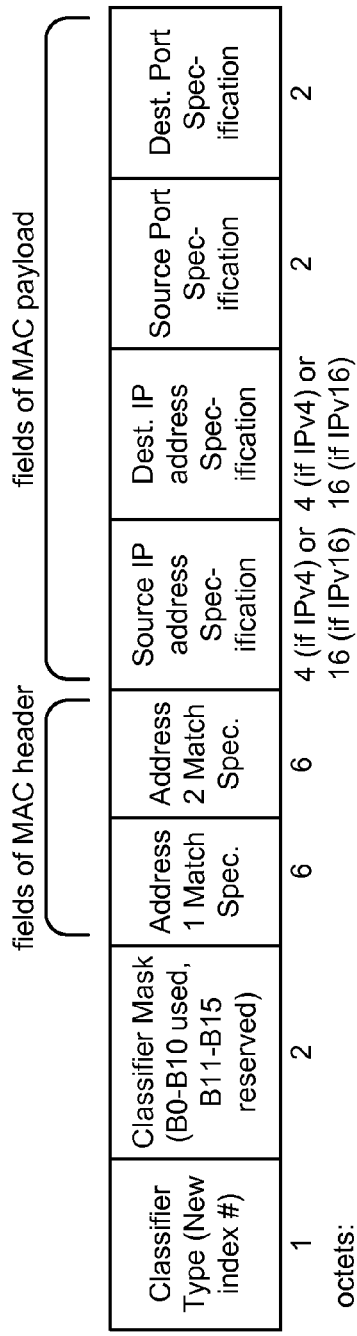
FIG. 27 illustrates an alternative embodiment of a New Classifier Type containing classification parameters based on the content of some fields of the MAC header and mad payload (Option~3).

FIG. 27 illustrates an alternative embodiment 2700 of a New Classifier Type containing classification parameters based on the content of some fields of the MAC header and mad payload (Option~3). This diagram illustrates another design/example of a new Classifier Type containing classification parameters based on the content of some fields of the MAC Header and MAC Payload, using design option~3.

The designs/examples illustrated in the various embodiments and/or diagrams associated with FIG. 22-27 demonstrate the design principle. Depending on the specific classification needs and requirements, other new Classifier Types of the TCLAS IE can be designed using the same principles.

Also, Revision/Expansion of the User Priority field of the TCLAS element may be performed in certain embodiments. For example Revision/Expansion of the User Priority field of the TCLAS element may be performed so that, in addition to the use defined in IEEE Std 802.11™—2012 (incorporated by reference herein), the User Priority field can be set to a special value (e.g., 255) to indicate its non-use, or set to a known and fixed value to indicate other special use, e.g., to convey an AC (Access Category) value as opposed to a user priority value.

For example, a value of 254 indicates AC_BE, a value of 253 indicates AC_BK, a value of 252 indicates AC VI, and a value of 251 indicates AC_VO.

Such values can be used for example, to identify specific Management frames which match that AC value. It is noted that that Data frames do not have a signaled AC value, but instead, a TID value, which can correlate to a specific AC (i.e., implied through a mapping function), but the purpose of the AC value here is to match a signaled AC value, i.e. to match the AC value that is explicitly included in a subfield in a frame, and not to match an implicit AC value.

Also, revision of the description in the Table of FIG. 19 may be made so that the classification applies to generic frames, instead of MSDUs (i.e., data frames) only. For example, "Incoming MSDU's higher layer parameters" may be changed to "Parameters of frames being processed by the classification function" in all instances in the Table of FIG. 19.

FIG. 28 illustrates an embodiment 2800 of revised encoding of processing subfield. Alternatively, the reserved value may be used to create new values (e.g., 3,4,5) for the Processing subfield of the TCLAS Processing element to enable its applicability to the classification of non-data frames, as shown in the Table of FIG. 28.

Figure 29:
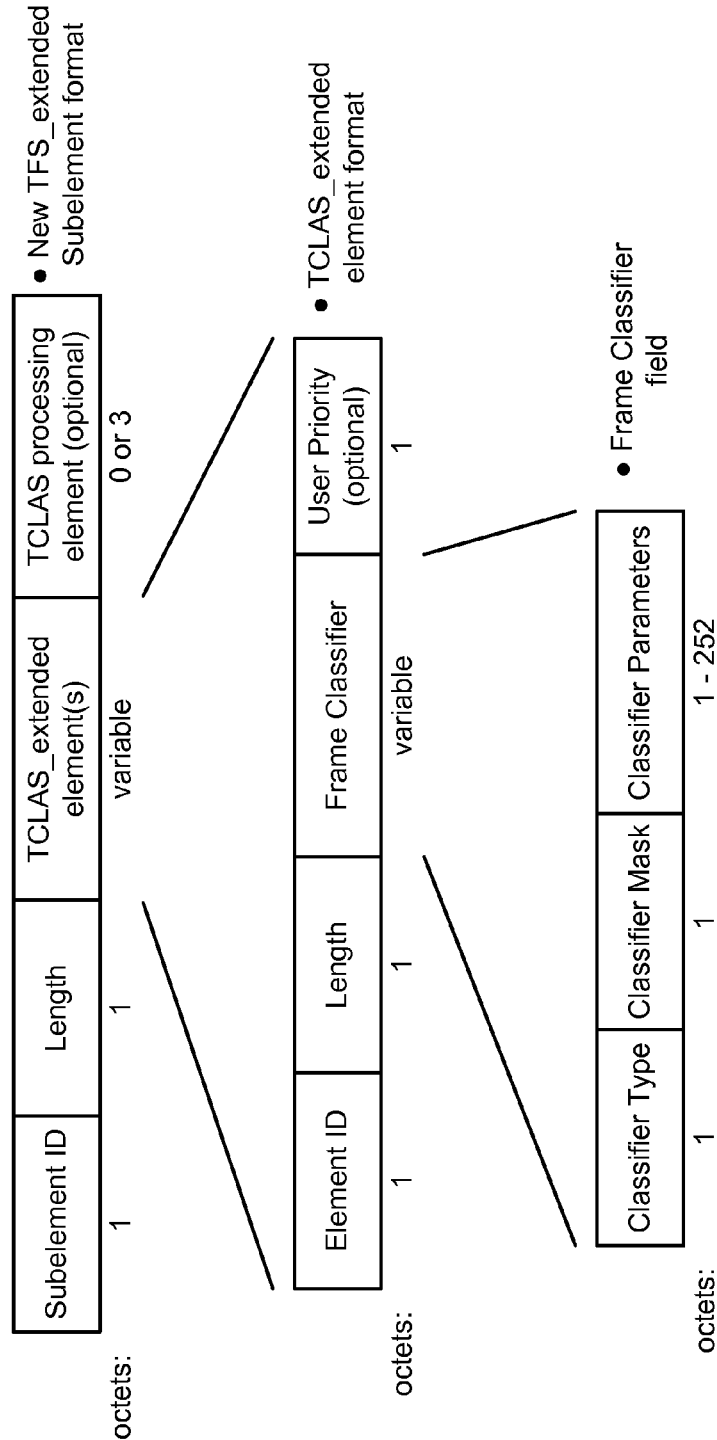
FIG. 29 illustrates an embodiment of Network TFS_Extended Subelement format, TCLAS_extended element format, and Frame Classifier field.

FIG. 29 illustrates an embodiment 2900 of Network TFS_Extended Subelement format, TCLAS_extended element format, and Frame Classifier field. In accordance with Method~2, By using a reserved number listed in the Table of FIG. 17, a new subelement may be designed for TFS Request frame, named "TFS Extended subelement" (or similar), which contains a new TCLAS_Extended element, as shown.

The Classifier Types of the TCLAS_extended element may use equivalent or the same designs as described for Method~4. The TCLAS Processing element of the TFS_extended Subelement uses the design for the revised TCLAS Processing element shown in FIG. 28.

A User Priority field may be present in the TCLAS_extended element. The TCLAS_extended element can be included in TFS Request frame or other frames to request the setup of an agreement for frame classification and the subsequent processing.

Classification Parameters may also be piggybacked onto Existing Frame Exchanges. For example, instead of including the classification parameters in the Classifier Type fields of the TCLAS element (as in Method~4) and/or the TCLAS_extended element (as in Method~2), Method~3 operates by piggybacking the necessary classification parameters in existing elements/frames using either the reserved fields or extension fields.

Figure 31:
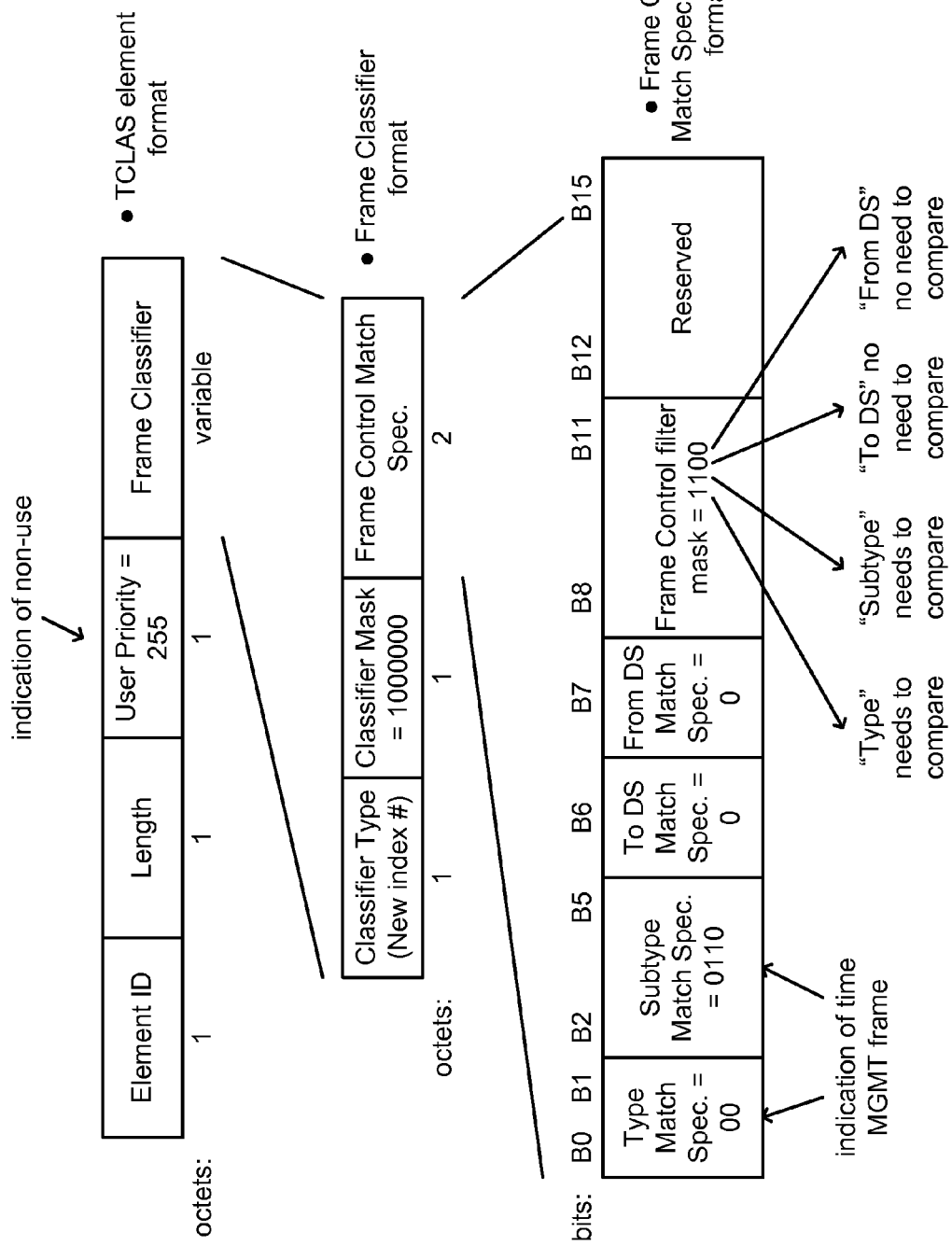
FIG. 31 illustrates an embodiment of TCLAS element format, Frame Classifier format, and Frame Control Match Specification subfield format.

FIG. 30-31 illustrates Usage Example~1 on how to use Method 1 to establish a classification agreement to classify Timing Measurement Management Action frames for subsequent processing (e.g., frame filtering). FIG. 30 illustrates an embodiment 3000 of TFS Subelement format and FIG. 31 illustrates an embodiment 3100 of the corresponding TCLAS element format, Frame Classifier format, and Frame Control Match Specification subfield format.

Figure 33:
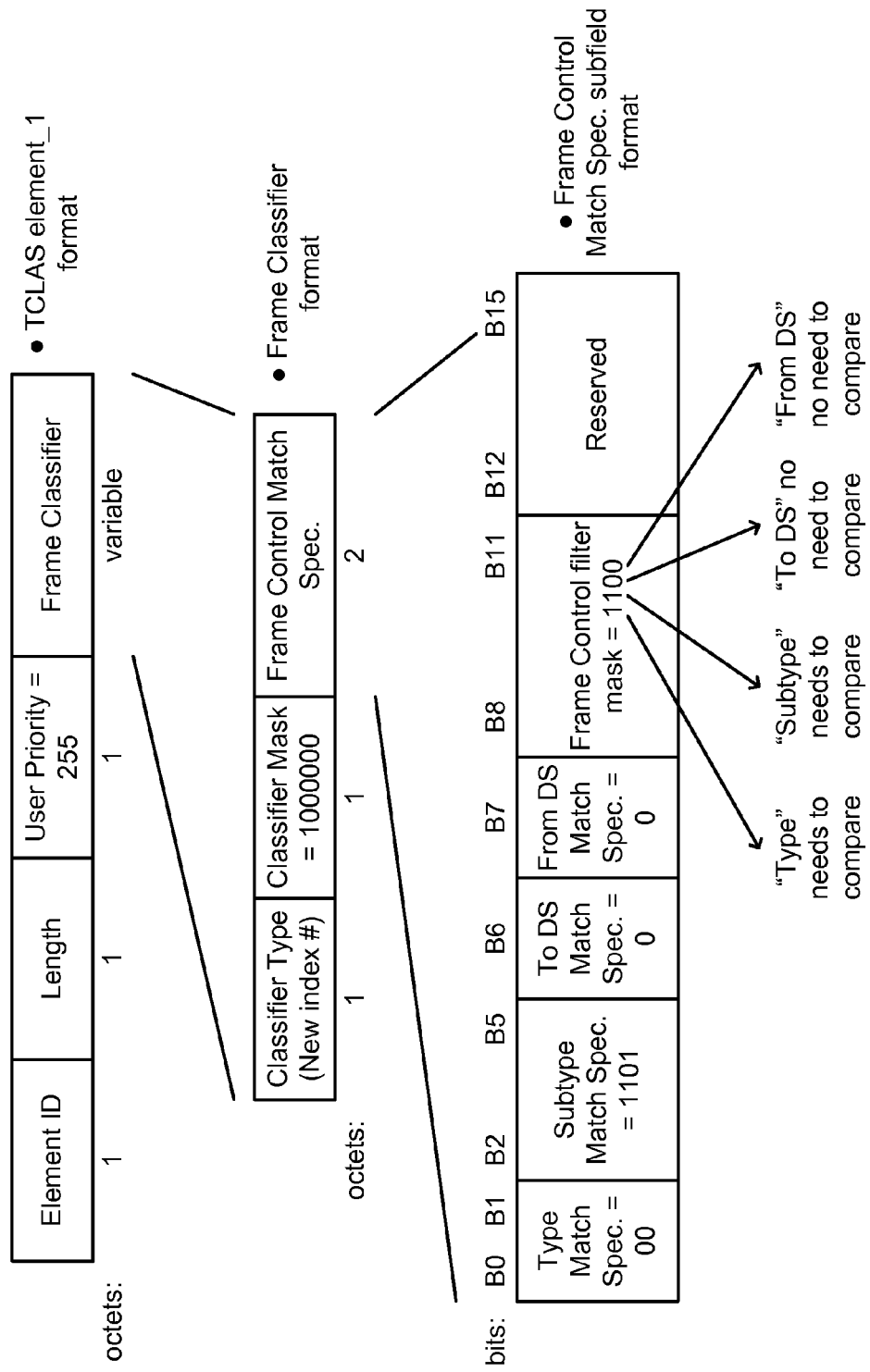
FIG. 33 illustrates another embodiment of TCLAS element format, Frame Classifier format, and Frame Control Match Specification subfield format.
Figure 34:
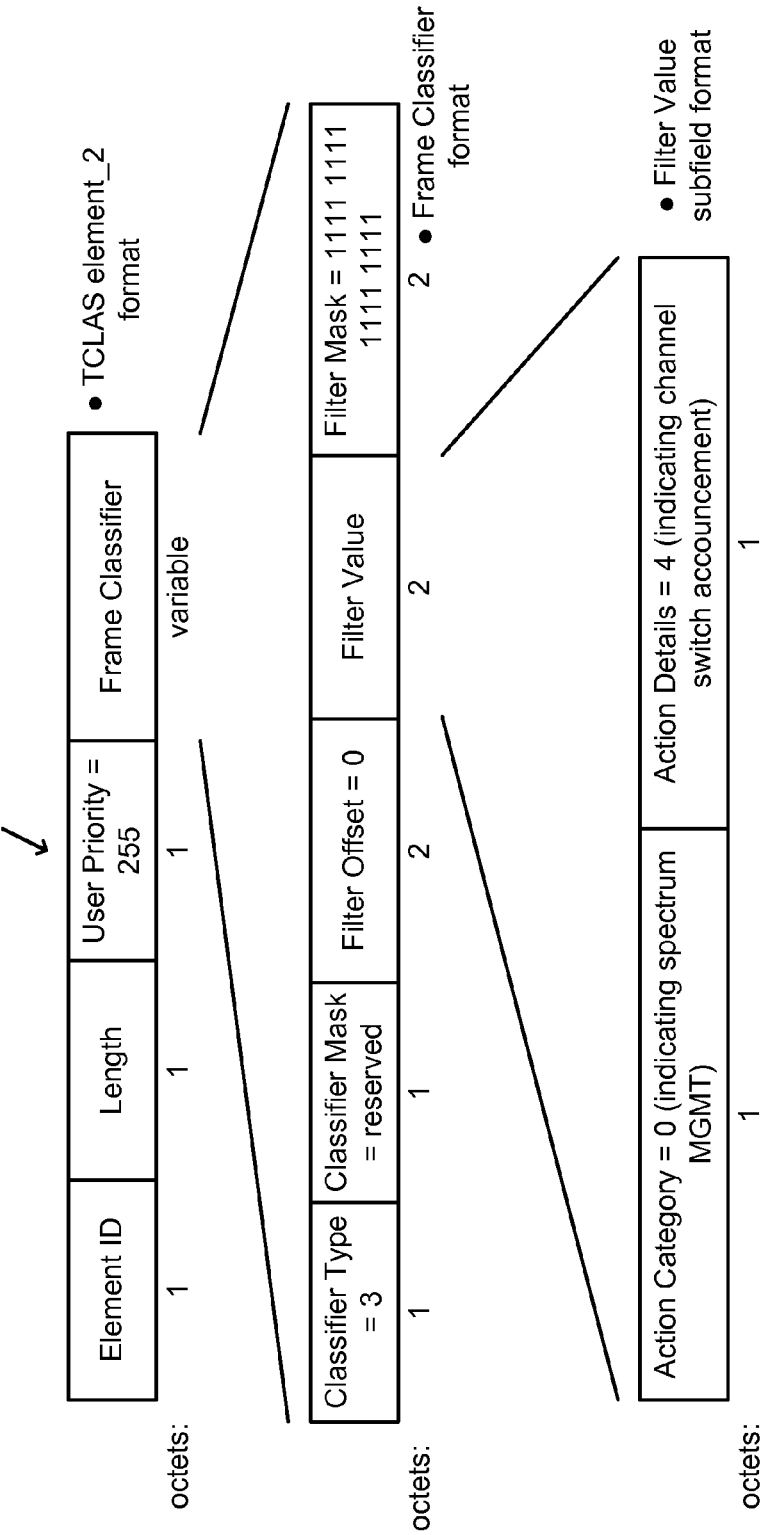
FIG. 34 illustrates an embodiment of TCLAS element format, Frame Classifier format, and Filter Value subfield format.
Figure 35:
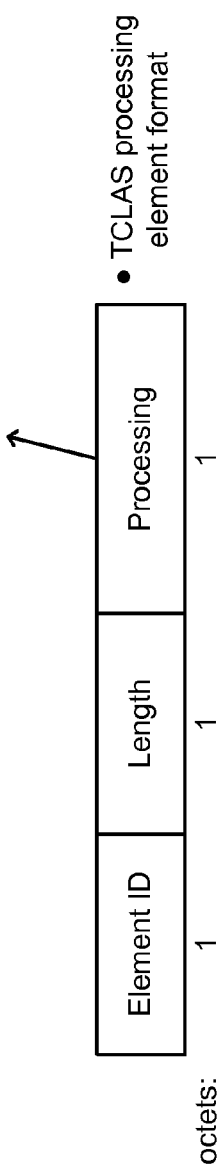
FIG. 35 illustrates an embodiment of TCLAS processing element format.

FIG. 32-35 illustrates Usage Example~2 on how to use method 1 to establish a classification agreement to classify Management Action frames whose action category value equals to Spectrum Management (i.e., category=0) and action details equals to Channel Switch Announcement (i.e., action field=4). FIG. 32 illustrates an embodiment 3200 of the corresponding TFS Subelement format (e.g., to establish classification agreement), FIG. 33 illustrates an embodiment 3300 of the corresponding first TCLAS element format, Frame Classifier format, and Frame Control Match Specification subfield format, FIG. 34 illustrates an embodiment 3400 of the corresponding second TCLAS element format, Frame Classifier format, and Filter Value subfield format, and FIG. 35 illustrates an embodiment 3500 of the corresponding TCLAS processing element format.

As illustrated in FIG. 32-35, include two TCLAS elements and one TCLAS Processing element in the TFS Request subelements field of the TFS Request element (which is included in the TFS Request frame), e.g., FIG. 15.

It is again and also noted that the any one or more of the various aspects, embodiments, and/or their equivalents, of the invention are also applicable to other WLAN MAC Header Format(s). For example, WLAN technology may introduce new MAC frame format(s) that are different from the one depicted in FIG. 4. The concept, design principle and methods described herein and in accordance with any one or more of the various aspects, embodiments, and/or their equivalents, of the invention remain applicable, regardless of the exact format of the new MAC Header format(s).

For design option~4 of the new Classifier Type design:

New Classifier Types (with the associated new Classifier Type index numbers) would be needed to include the match specifications for the fields of a new MAC Header format. The length of Classifier Mask is chosen so that the number of bits in Classifier Mask is sufficient to accommodate the match specifications for the existing MAC Header fields and the new MAC Header fields. The unused bits are reserved.

For design option~2 of the new Classifier Type design:

New Classifier Types (with the associated new Classifier Type index numbers) would be needed to include match specifications for the fields of a new MAC header. The length of Classifier Mask is fixed and is chosen so that the number of the bits in Classifier Mask is sufficient to accommodate the match specifications for existing MAC Header fields and the new MAC Header fields. The unused bits in Classifier Mask are reserved and are for possible future use.

For design option~3 of the new Classifier Type design:

New Classifier Types (with the associated new Classifier Type index numbers) would be needed to include the match specifications for the fields of a new MAC Header format and the fields of the MAC Payload.

The length of Classifier Mask is chosen so that the number of bits in Classifier Mask is sufficient to accommodate the match specifications for the existing MAC Header fields and the new MAC Header fields as well as the necessary MAC Payload fields. The unused bits are reserved.

MAC Header Field Bit Masking

Figure 39:
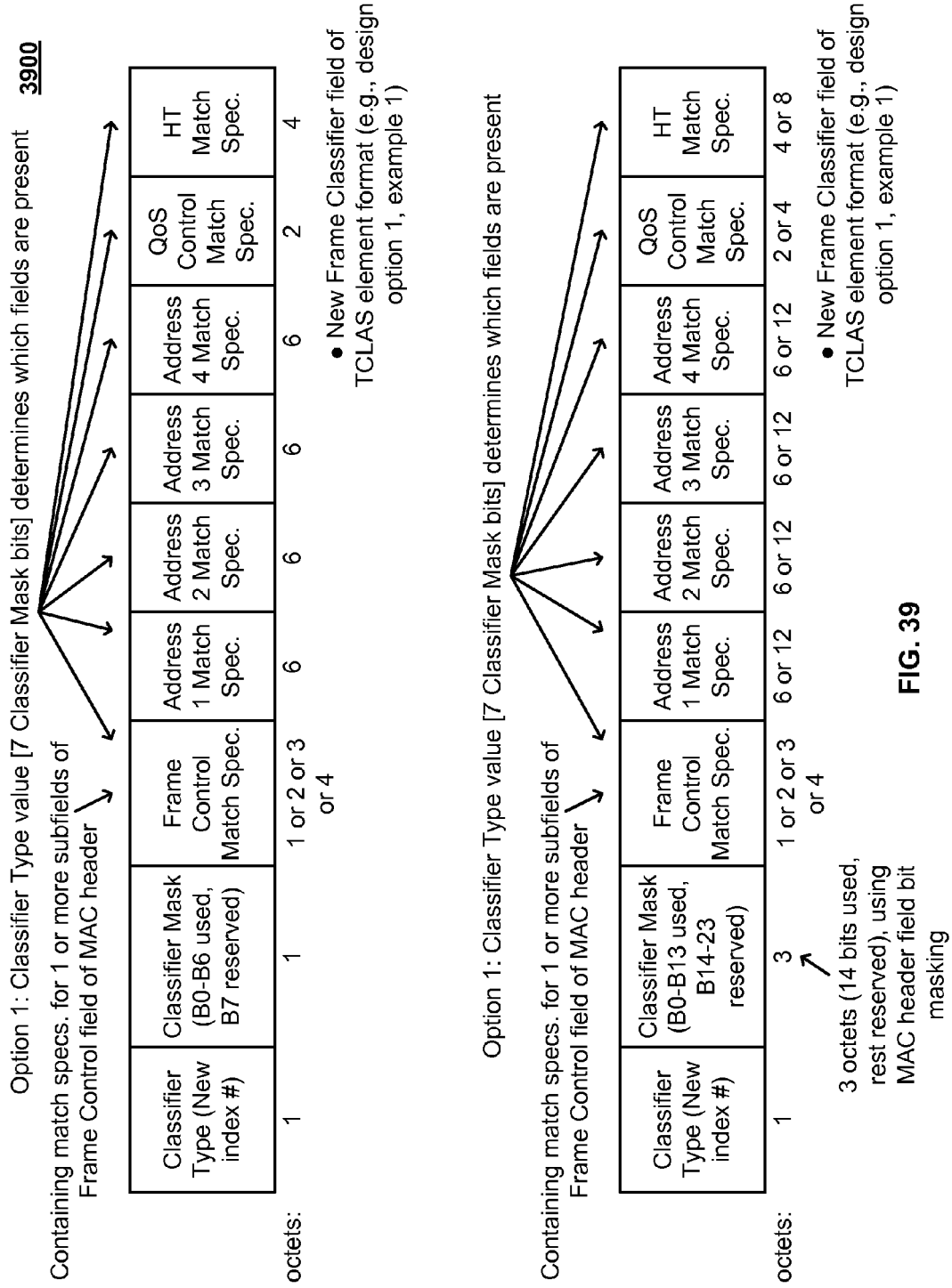
FIG. 39 illustrates other embodiments of New Frame Classifier field of TCLAS element format (e.g., the bottom diagram in accordance with MAC header field bit masking for method~1/Design Option~1).

For both the design option~4 and 2 of the new Classifier design, for a given Classifier Type, use 2 bits in the Classifier Mask for each MAC Header subfield as follows:

For design option~1, one of the 2 bits indicates the use of the corresponding MAC Header field for comparison or not, and the other one of the 2 bits indicates whether the match specification for a corresponding MAC header field Filter Mask subfield is included which can also convey the length of the corresponding field in the Classifier Type. An example is illustrated in FIG. 39. The Filter Mask within the Match Specification for a MAC Header field has the same length in bits as the corresponding MAC Header field.

Figure 40:
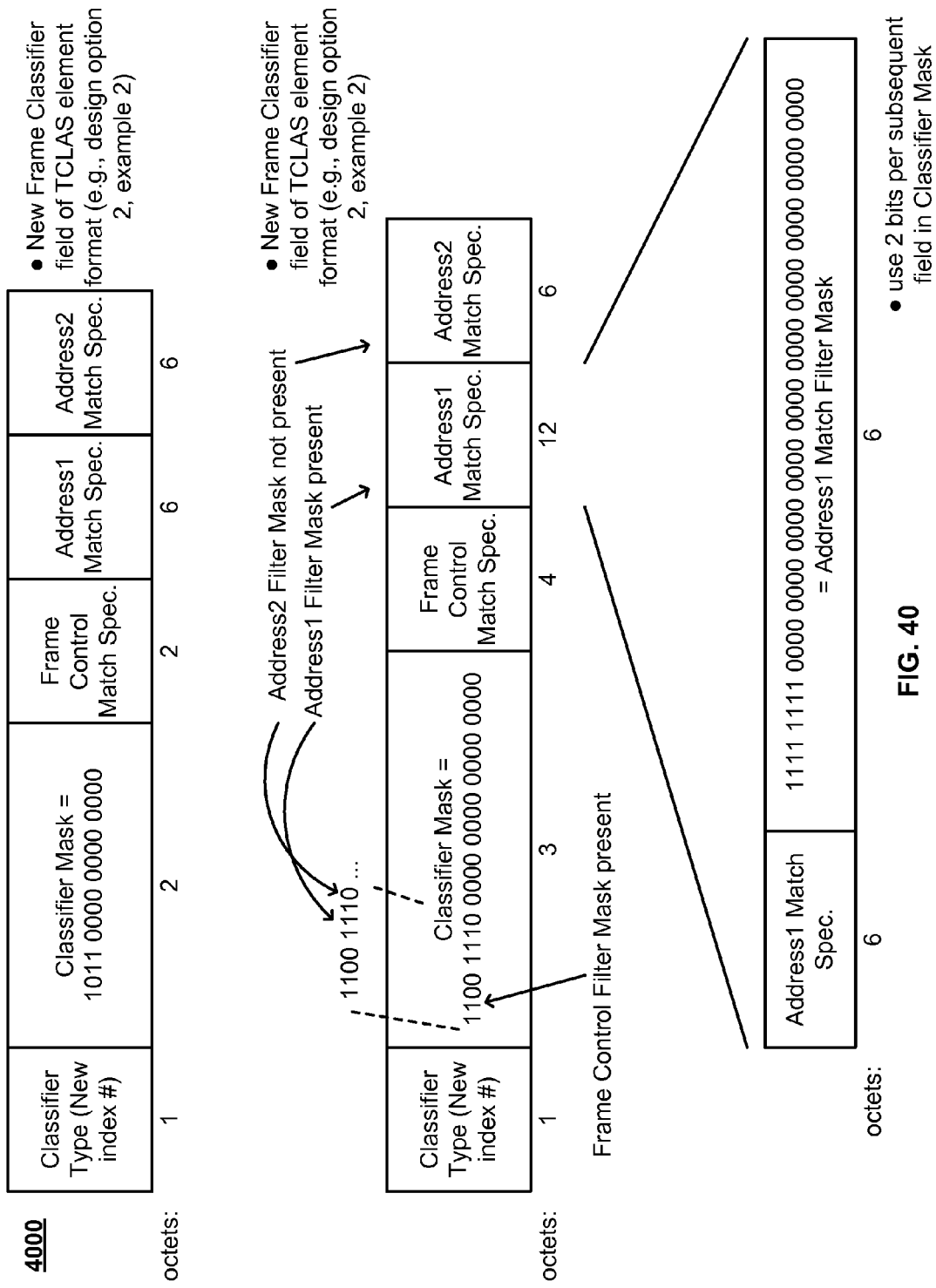
FIG. 40 illustrates an embodiment of other embodiments of New Frame Classifier field of TCLAS element format (e.g., the bottom diagram in accordance with MAC header field bit masking for method~1/Design Option~2).

For design option~2, one of the 2 bits indicates whether the match specification for a corresponding MAC Header field is present in the Classifier Type and used for comparison (or not present), and the other one of the 2 bits indicates whether a corresponding Filter Mask subfield is included or not. The Filter Mask within the Match Specification for a MAC Header field has the same length in bits as the corresponding MAC Header field. An example is illustrated in FIG. 40. When a corresponding bit is set to the value of 0 to indicate the associated field absent, the other bit is reserved.

For the design option~3 of the new Classifier design, for a given Classifier Type, use 2 bits in the Classifier Mask for each MAC Header and MAC Payload subfield as follows:

One of the 2 bits indicates the use of the corresponding MAC Header field and MAC Payload field for comparison or not, and the other one of the 2 bits indicates whether the match specification for a corresponding MAC Header field Filter Mask subfield or a corresponding MAC Payload field Filter Mask subfield is included which can also convey the length of the corresponding field in the Classifier Type. An example is illustrated on FIG. 41. The Filter Mask within the Match Specification for a MAC Header field has the same length in bits as the corresponding MAC Header field. The Filter Mask within the Match Specification for a MAC Payload field has the same length in bits as the corresponding MAC Payload field.

When using MAC Header field bit masking, the setting of the Filter Mask presence bit determines the Filter Mask for that filed is present or not, and therefore, is used when determine the total number of bytes in the complete filter specification.

MAC Header Field Bit Masking may also be performed. For example, in a Classifier Type, the match specifications for the MAC Header fields with a corresponding Filter Mask are illustrated in FIG. 36-37.

Figure 36:
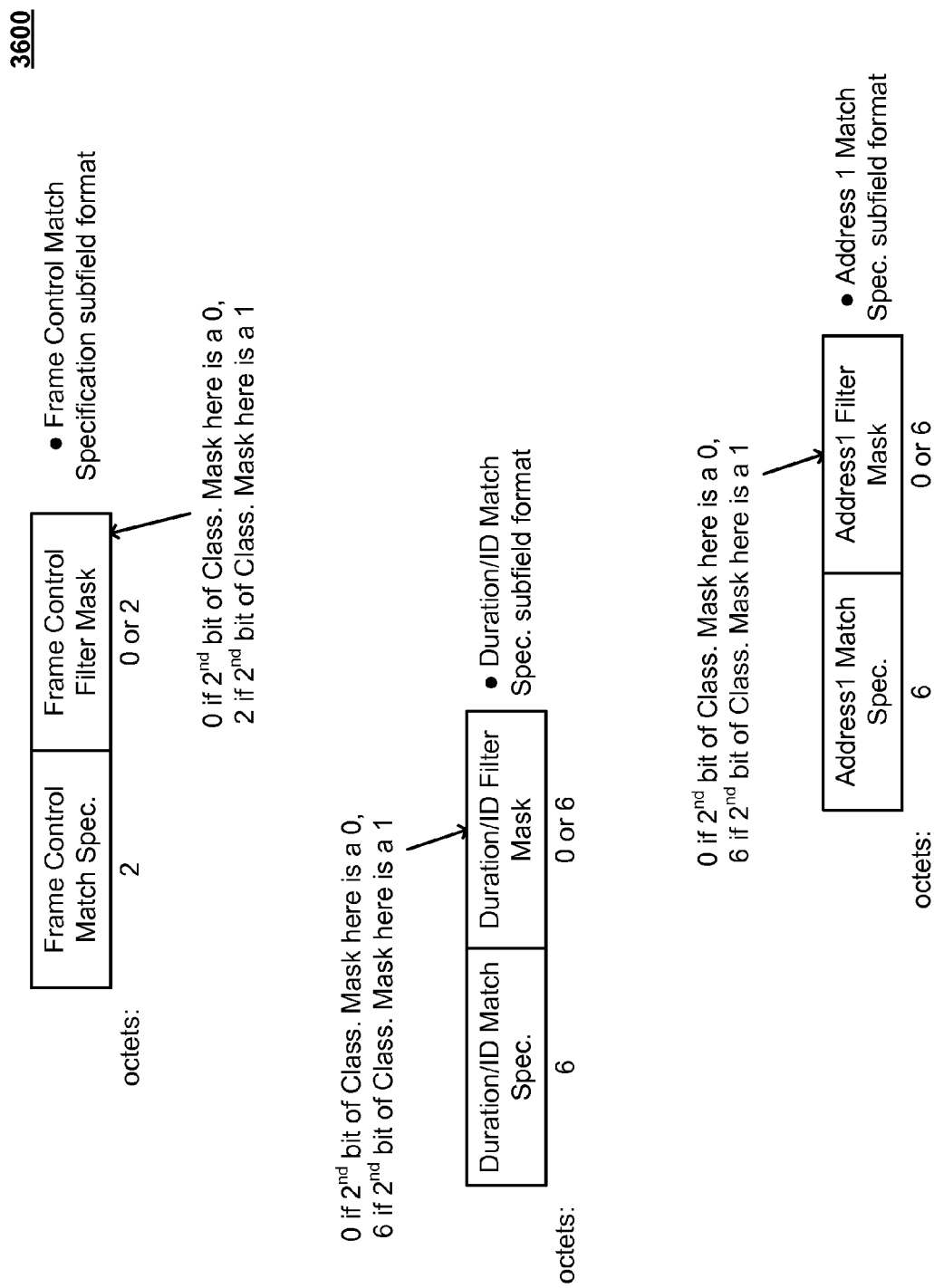
FIG. 36 illustrates various embodiments of Frame Control Match Specification subfield format, Duration/ID Match Spec. subfield format, and Address 1 Match Specification subfield format.

In particular, FIG. 36 illustrates various embodiments 3600 of Frame Control Match Specification subfield format, Duration/ID Match Spec. subfield format, and Address 1 Match Specification subfield format. With respect to these embodiments, it is noted that that in each of them, these fields are match specifications for MAC header fields that might appear within the Classifier Parameters portion of the TCLAS, depending on the classifier type value and the used design option (e.g., design option~1 or design option~2 or design option~3).

FIG. 37 illustrates an embodiment 3700 of various embodiments of Address 2 Match Specification subfield format, Address 2 Match Specification subfield format, Sequence Control Match Specification subfield format, Quality of Service (QoS) Match Specification subfield format, and High Throughput (HT) Match Specification subfield format.

It is noted that in each of these various diagrams and/or figures in FIG. 36-37, these fields are match specifications for MAC header fields that might appear within the Classifier Parameters portion of the TCLAS, depending on the classifier type value and the used design option (i.e., design option~4 or design option~2).

The match specification for a corresponding MAC Header field (e.g, Frame Control, Duration/ID, Address1, Address2) is contained in the Match Specification subfield (i.e., the respective left subfield shown in FIGS. 36-37).

The Filter Mask subfield is a bitmap used to indicate which bits of the corresponding MAC Header field need to be compared when processing a frame. The bitmap is ordered from the LSB to the MSB, with each bit pointing to one of the bits of the respective relative positions in the corresponding MAC Header field. The length of the Filter Mask subfield is the same as the length of the corresponding MAC Header field. A bit that is not to be compared is considered a "don't care" for matching purposes.

Similarly, an example for the match specification for the MAC Payload fields with a corresponding Filter Mask is illustrated in FIG. 38.

For both the design option~1, 2, and 3 of the new Classifier design, a portion of a MAC Header field (e.g., Address1 field in the MAC Header), instead of the entire field, may be included as the match specification in a Classifier Type. If so, the exact content and length of the match specification for the particular MAC Header field in a Classifier Type are indicated using the same design principle and method(s) described in herein.

FIG. 38 illustrates an embodiment 3800 of MAC payload field bit masking. The design principle of Bit Masking for MAC Header field can also be used for the MAC Payload, when Method~4, Option~3 is used. FIG. 38 illustrates an example for the Source Port Match Specification subfield of such a design.

FIG. 39 illustrates other embodiments 3900 of New Frame Classifier field of TCLAS element format (where the bottom diagram in accordance with MAC header field bit masking for method~1/Design Option~1).

Figure 41:
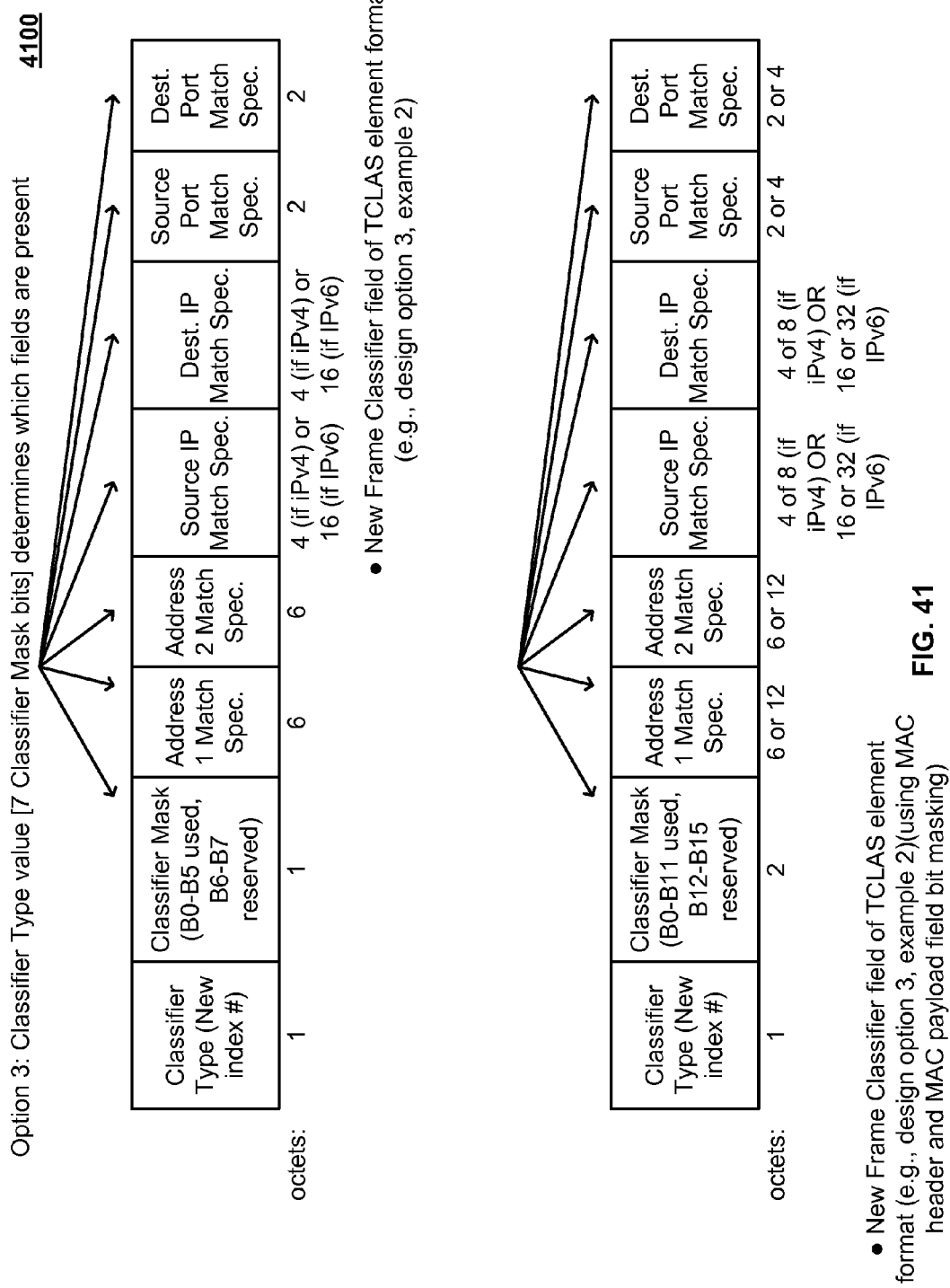
FIG. 41 illustrates an alternative embodiment of New Frame Classifier field of TCLAS element format (e.g., the middle and bottom diagrams in accordance with MAC header field bit masking for method~1/Design Option~3)(with bottom portion of diagram using MAC header and MAC payload field bit masking).

FIG. 40 illustrates an embodiment 4000 of other embodiments of New Frame Classifier field of TCLAS element format (where the middle and bottom diagrams in accordance with MAC header field bit masking for method~1/Design Option~2). FIG. 41 illustrates an alternative embodiment 4100 of New Frame Classifier field of TCLAS element format (e.g., in accordance with MAC header field bit masking for method~1/Design Option~3)(with bottom portion of diagram using MAC header and MAC payload field bit masking).

Generally speaking, a novel approach by which classification may be formed using MAC header content is described herein. For example, WLAN frame classification may be performed based on the MAC Header content. Again, however, generally speaking, any type of communication network may operate using any one or more of the various aspects, embodiments, and/or their equivalents, of the invention. Also, such WLAN frame classification may be performed based on the MAC Header content, and possibly with MAC Payload content. In addition, different respective means by which the corresponding classification parameters sender requirements may be established are also described herein.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features of the present invention have been expressly described herein, other combinations of these options, methods, functions and features are likewise possible. The present invention is not limited by the particular examples disclosed herein and expressly incorporates these other combinations.

What is claimed is:

1. A communication device, comprising:
at least one transceiver to support communications with at least one additional communication device; and
a processor, coupled to the at least one transceiver, to:
establish a filter and classification agreement between the communication device and the at least one additional communication device via the communications, the filter and classification agreement indicating MAC frames of at least one of a plurality of frame types to be filtered out and not transmitted to the at least one additional communication device and further that a type classifier (TCLAS) element of a traffic filtering service request element of a MAC frame header contains classification data;
classify a MAC frame in accordance with the filter and classification agreement as one of the plurality of frame types based on the classification data indicated by the TCLAS element and further based on at least a portion of a frame body portion of the MAC frame containing a data payload; and
selectively filter out and not transmit the MAC frame to the at least one additional communication device, based on the one of the plurality of frame types in accordance with the filter and classification agreement between the communication device and the at least one additional communication device.

2. The communication device of claim 1, wherein the MAC frame is received via the at least one transceiver.

3. The communication device of claim 1, wherein the MAC frame is received via a host interface or received from a baseband processor.

4. The communication device of claim 1, wherein the MAC frame is formatted in accordance with an 802.11 protocol.

5. The communication device of claim 1, wherein the MAC frame is addressed to the at least one additional communication device.

6. The communication device of claim 1, wherein the communication device is a wireless station (STA).

7. The communication device of claim 1, wherein the at least one additional communication device is a wireless station (STA).

8. A method comprising:
 establishing a filter and classification agreement between a communication device and at least one additional communication device via at least one transceiver, the filter and classification agreement indicating MAC frames of at least one of a plurality of frame types to be filtered out and not transmitted to the at least one additional communication device and further that a type classifier (TCLAS) element of a traffic filtering service request element of a MAC frame header contains classification data;
 classifying, via a processor of the communication device, a MAC frame in accordance with the filter and classification agreement as one of the plurality of frame types based on the classification data indicated by the TCLAS element and further based on at least a portion of a frame body portion of the MAC frame containing a data payload; and
 selectively filtering, via the processor of the communication device, by not transmitting the MAC frame to the at least one additional communication device, based on the one of the plurality of frame types in accordance with the filter and classification agreement between the communication device and the at least one additional communication device.

9. The method of claim 8, further comprising:
 receiving the MAC frame via the at least one transceiver.

10. The method of claim 8, further comprising:
 receiving the MAC frame via a host interface of the communication device or a baseband processor of the communication device.

11. The method of claim 8, wherein the MAC frame is formatted in accordance with an 802.11 protocol.

12. The method of claim 8, wherein the MAC frame is one of: a data frame, a management frame, a control frame, and an extension frame.

13. The method of claim 8, wherein the MAC frame is addressed to the at least one additional communication device.

14. A communication device, comprising:
 at least one transceiver to support communications with at least one additional communication device, the communications including establishment of a filter and classification agreement between the communication device and the at least one additional communication device via the communications, the filter and classification agreement indicating MAC frames of at least one of a plurality of frame types to be filtered out and not transmitted to the at least one additional communication device and further that a type classifier (TCLAS) element of a traffic filtering service request element of a MAC frame header contains classification data; and
 a processor, coupled to the at least one transceiver, to:
  classify a MAC frame in accordance with the filter and classification agreement as one of the plurality of frame types based on the classification data indicated by the TCLAS element and further based on at least a portion of a frame body portion of the MAC frame containing a data payload; and
  selectively filter the MAC frame by not transmitting the MAC frame to the at least one additional communication device, based on the one of the plurality of frame types in accordance with the filter and classification agreement between the communication device and the at least one additional communication device.

15. The communication device of claim 14, wherein the MAC frame is received via the at least one transceiver.

16. The communication device of claim 14, wherein the MAC frame is received via a host interface or received from a baseband processor.

17. The communication device of claim 14, wherein the MAC frame is formatted in accordance with an 802.11 protocol.

18. The communication device of claim 14, wherein the MAC frame is addressed to the at least one additional communication device.

19. The communication device of claim 14, wherein the communication device is a wireless station (STA).

20. The communication device of claim 14, wherein the at least one additional communication device is a wireless station (STA).

\* \* \* \* \*